(12) United States Patent
Hussain et al.

(10) Patent No.: US 8,745,102 B2
(45) Date of Patent: Jun. 3, 2014

(54) DISTRIBUTED STORAGE METHOD AND SYSTEM

(75) Inventors: Syed Saadullah Hussain, Santa Clara, CA (US); Todd Steven Wheeler, San Jose, CA (US)

(73) Assignee: PLAiR Media, Inc., Santa Clara, CA (US)

( * ) Notice: Subject to any disclaimer, the term of this patent is extended or adjusted under 35 U.S.C. 154(b) by 0 days.

(21) Appl. No.: 13/545,657

(22) Filed: Jul. 10, 2012

(65) Prior Publication Data

US 2013/0018929 A1    Jan. 17, 2013

Related U.S. Application Data

(60) Provisional application No. 61/506,639, filed on Jul. 12, 2011.

(51) Int. Cl.
*G06F 12/00* (2006.01)
*G06F 17/30* (2006.01)

(52) U.S. Cl.
CPC .................................. *G06F 17/302* (2013.01)
USPC ........... 707/822; 707/827; 711/154; 711/155; 711/156

(58) Field of Classification Search
None
See application file for complete search history.

(56) References Cited

U.S. PATENT DOCUMENTS

| | | | |
|---|---|---|---|
| 6,282,602 B1 * | 8/2001 | Blumenau et al. | 711/4 |
| 6,697,868 B2 * | 2/2004 | Craft et al. | 709/230 |
| 7,289,964 B1 * | 10/2007 | Bowman-Amuah | 705/1.1 |
| 7,512,744 B2 * | 3/2009 | Banga et al. | 711/147 |
| 8,010,992 B1 * | 8/2011 | Chang et al. | 726/1 |
| 8,392,575 B1 * | 3/2013 | Marr | 709/226 |
| 2010/0332401 A1 * | 12/2010 | Prahlad et al. | 705/80 |
| 2010/0332479 A1 * | 12/2010 | Prahlad et al. | 707/741 |
| 2010/0333116 A1 * | 12/2010 | Prahlad et al. | 719/328 |
| 2011/0126110 A1 * | 5/2011 | Vilke et al. | 715/736 |
| 2011/0126198 A1 * | 5/2011 | Vilke et al. | 718/1 |
| 2011/0208837 A1 * | 8/2011 | Sartori | 709/219 |
| 2013/0003725 A1 * | 1/2013 | Hendel et al. | 370/353 |

* cited by examiner

*Primary Examiner* — Angelica Ruiz
(74) *Attorney, Agent, or Firm* — Patterson & Sheridan, LLP

(57) ABSTRACT

Methods and systems are disclosed for distributed storage systems. For example, a device can receive a read request for a first file, where the read request is generated by a host device. The read request is configured to access a file on the host device. The device can access mappings to identify a first mapping. The device can identify a first file on a mobile device based on the first mapping. The device can access the first file, where the accessing uses the first mapping. The device can access the first file by communicating with the mobile device to read the first file. The device can then return the first file.

18 Claims, 21 Drawing Sheets

DISTRIBUTED STORAGE METHOD AND SYSTEM

A. PRIORITY CLAIM

This application claims the benefit, under 35 U.S.C. §119 (e), of U.S. Provisional Patent Application No. 61/506,639, entitled "A Distributed FAT Device," filed Jul. 12, 2011, and naming Saad Hussain and Todd Wheeler as inventors. The above-referenced application is hereby incorporated by reference herein in its entirety.

B. BACKGROUND

1. Field of the Invention

This application is related to storage systems. Particularly, this application relates to using various connectivity options with distributed storage systems.

2. Description of the Related Art

Various media host devices, such as TVs and car stereos, include USB connectivity options for accessing media stored on communication devices. These media host devices can access data stored on the communication devices that are directly attached. For example, both the media host device and the communication device are typically required to implement proprietary driver and storage protocols. Furthermore, there are limited, if any, options available for media host device for accessing data located on devices not directly attached (e.g., via USB) to that media host device. It would be advantageous to provide an easier and more flexible access between media host devices and any such mobile devices.

C. SUMMARY

A communication device is proposed that enables communication between a media host device and one or more mobile devices. The communication device is configured to couple to the media host device (such as by using USB) and to the mobile device(s) (such as by using Ethernet). The communication device is able to make the mobile device(s) appear as if the mobile device(s) were directly connected to the media host device. As a result, the media host device is able to access any data, such as video/audio files, stored on the mobile device(s). Furthermore, the media host device is able to connect and access the communication device by using traditional USB commands, such as using USB mass storage protocol. The mobile device(s) are also able to store data without using a specialized file system. As a result, the communication device facilitates connectivity between media host device and mobile device(s) without using proprietary storage or communication protocols on the media host device. In other words, the media host device can access data (e.g., read and write media files) from/to mobile devices without using any additional hardware and/or software.

The communication device can also allow access to files on the mobile device(s) by mapping these files to the file structure of the media host device. In another implementation, the mobile device(s) can map files and provide these mapped files to the communication device. As a result, the communication device also allows user(s) to access data stored on mobile device(s) from almost any media host device that includes a USB port. For example, an application may be installed on the mobile device to provide the stored media to the communication device, and thus to the media host device.

Techniques are also presented for implementing and using a distributed FAT (DFAT) system. The DFAT allows a disk to be divided among two or more devices. As a result, any entity (e.g., an operating system) that access a file through the DFAT, can access this file regardless of where this file is physically located. Furthermore, the DFAT enables any entity to access this file in the same manner as accessing a conventional FAT system. In one implementation, the mappings performed by the communication device(s) and/or the mobile device(s) use such DFAT for file access.

D. LIST OF FIGURES

The embodiments of the present application may be better understood, and its numerous objects, features, and advantages made apparent to those skilled in the art by referencing the accompanying drawings.

Figure 1:
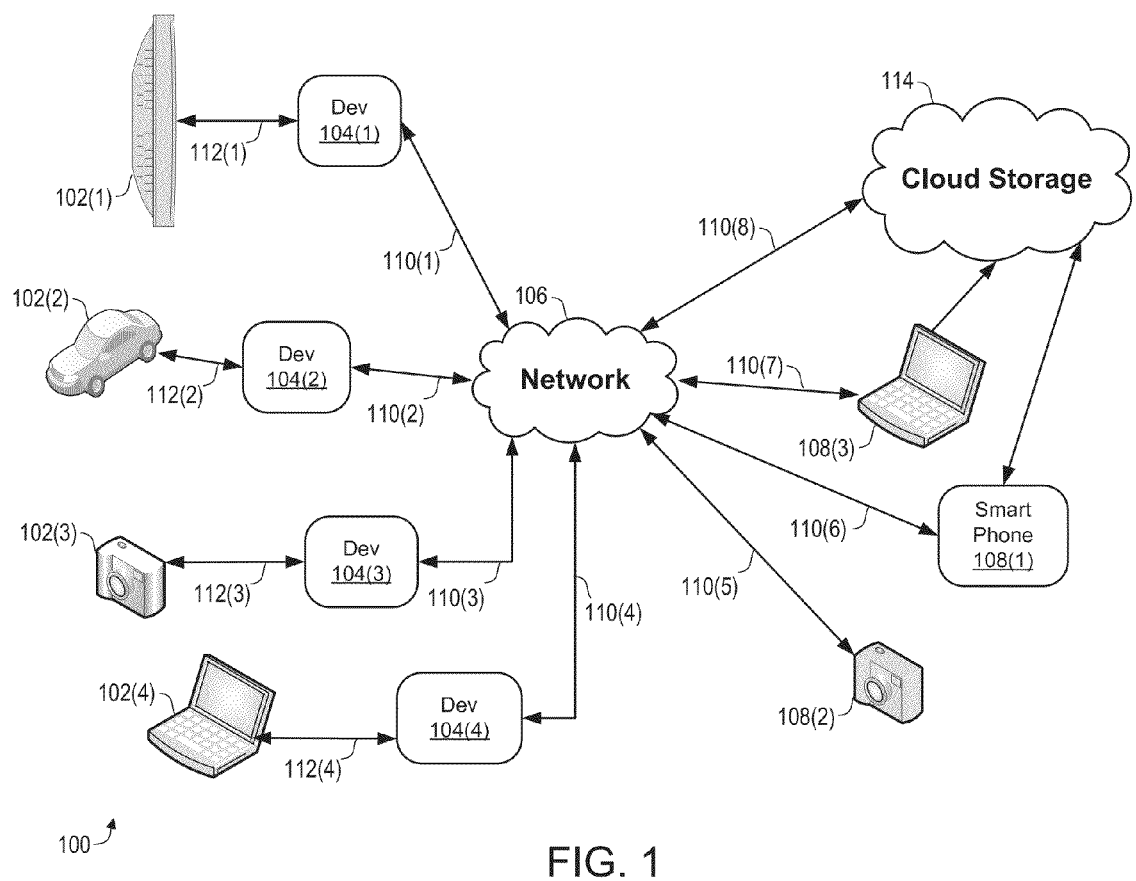
FIG. 1 is a block diagram illustrating various host devices, communication devices, and mobile devices, according to one or more embodiments.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

E. DETAILED DESCRIPTION

The communication devices described herein enable communication between media host devices and mobile devices. As shown in block diagram 100 of FIG. 1, a media host device ("host") can be one or more of a TV 102A, a car stereo 102B, a camera 102C, a laptop 102D, and/or any other device that includes a communication port (such as an USB port) for accessing files on a communication device, such as a hard drive or network attached storage (NAS), among others. The communication port can be implemented using any number of wired and/or wireless communication technologies, such as USB, Firewire, Bluetooth, Nearfield communication (NFC), Ethernet, WiFi, Thunderbolt, among other input/output (I/O) communication protocols. For ease of explanation, USB will be described in this application, however, this implementation is not meant to be limiting.

The host can, for example, be capable of accessing media files from a communication device. For example, a host (e.g., a TV) may be able to access (e.g., to perform playback) a movie from a communication device, such as a USB thumbdrive or a hard drive with USB connectivity. However, the host is typically limited to using conventional communication devices that store such media content.

With reference to FIG. 1, communication devices 104(1)-104(4) can couple to host devices 102(1)-102(4) using communication networks 112(1)-112(4), respectively, such as USB networks. In one implementation, a communication device 104(1) can be a USB device, such having a USB thumbdrive form factor, and thus be capable of coupling to host device 102(1) using a USB port on host 102(1). Communication device 104(1) can also access, using a network 106, any number of smart devices 108(1)-108(3) and/or cloud storage 114.

In some implementations, communication device(s) 104(1)-104(4) can access data (over network 106) stored using one or more smart devices 108(1)-108(3). Communication device(s) 104(1)-104(4) can communicate using a LAN/WAN network protocol, such as any wired and/or wireless network (shown as connections 110(1)-110(4), respectively) with network 106. Network 106 can also be a LAN/WAN, and it can also represent the Internet/World Wide Web (WWW). Network 106 can include one or more switches, hubs, and/or routers, etc., which are not shown in FIG. 1 for ease of explanation. Similarly, smart device(s) 108(1)-104(3) can communicate using a LAN/WAN network protocol, such as any wired and/or wireless network (shown as connections 110(5)-110(7), respectively) with network 106. One or more of network(s) 110(1)-110(8) can include Ethernet, WiFi, any cellular network (e.g., 3G/4G, etc), and/or others. In one embodiment, network(s) 110(1)-110(8) and 106 can be implemented using one network.

In some implementations, communication device(s) 104(1)-104(4) can access data (over network 106) stored using cloud storage 114. In one implementation, communication device(s) 104(1)-104(4) can access data stored using cloud storage directly (e.g., via connection 110(8)), e.g., without using smart device(s) 108(1)-108(3). In another implementation, communication device(s) 104(1)-104(4) can access data stored using cloud storage 114 by using smart device(s) 108(1)-108(3), which then access cloud storage 114. Cloud storage 114 can include networked storage, as well as one or more servers that can implements various functionality of the smart device(s).

It is noted that the name "smart device" is not limiting, and can include a variety of devices with network communication capability, such as a smart phone, a camera, a laptop, and/or a portable gaming system, among others. The smart device can also include local file storage, and/or have access to file storage. In some embodiments, cloud storage 114 can virtualize one or more smart devices, such by using one or more servers to implement functionality of smart device(s), including the elements and functionality described with reference to element 204 of FIG. 2A, element 276 of FIG. 2C, element 404 of FIG. 4A, and/or element 476 of FIG. 4C. For example, cloud storage can implement one or more node(s), such as described in FIG. 12. The smart device(s) are also referred to herein as mobile device(s), indicating that in some embodiments, some smart device(s) can be transported; however the terms are not so limiting, and can be used interchangeably.

The communication device can thus couple both to the media host device (e.g., using USB network) and to the mobile device(s) (e.g., using a WiFi or other wireless network). The communication device gives the media host device access to files that are stored using the mobile device(s) by making these stored files appear as if the mobile device(s) were directly connected to the media host device. The host does not require any specialized communication and/or storage protocols to communicate with this communication device. As a result, the communication device makes any files on the mobile device(s) appear to the host as if these files were stored on the communication device itself. In one embodiment, the communication device couple to the host device using a USB network, including typical physical USB connections. The communication device can then also couple to smart device(s) and/or cloud storage using wireless network(s), such as WiFi.

The host device is able to connect to and access the communication device without using a specialized protocol on the media host device. The mobile device(s) are also able to store data without using a specialized file storage protocol. As a result, the communication device facilitates seamless connectivity between media host devices and mobile device(s). For example, the host device can access media files stored on a smart phone, without using proprietary storage or communication protocols. The communication device thus allows the host device to easily access, for example, media files on any number of mobile device(s).

Figure 2A:
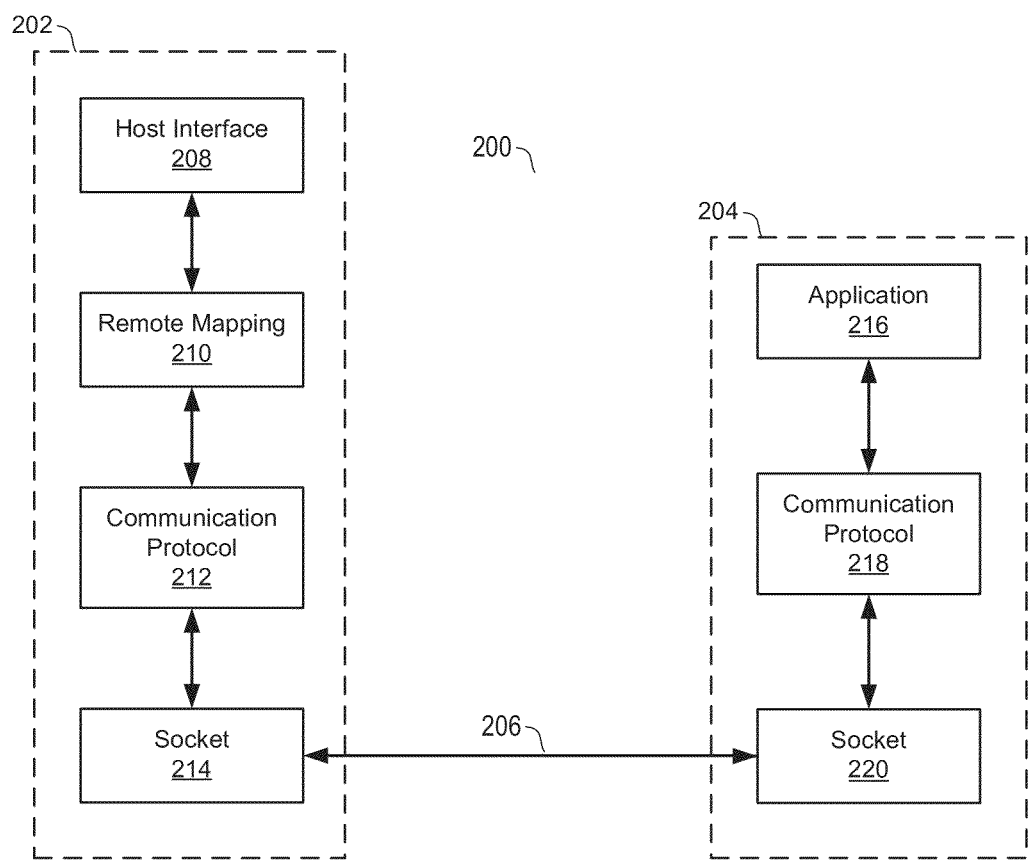
FIGS. 2A-2C are block diagrams illustrating communication device(s) and mobile device(s) that implement distributed storage techniques, according to one or more embodiments.
Figure 2B:
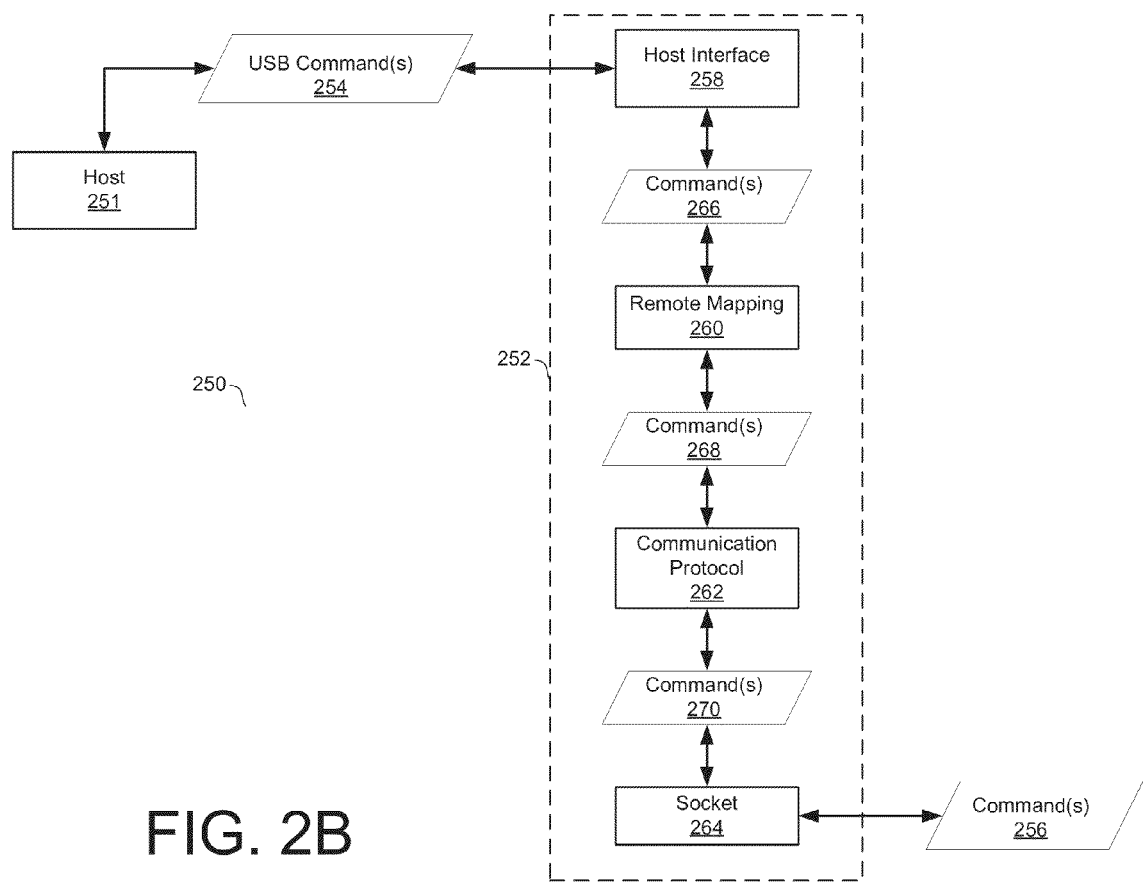
Figure 2C:
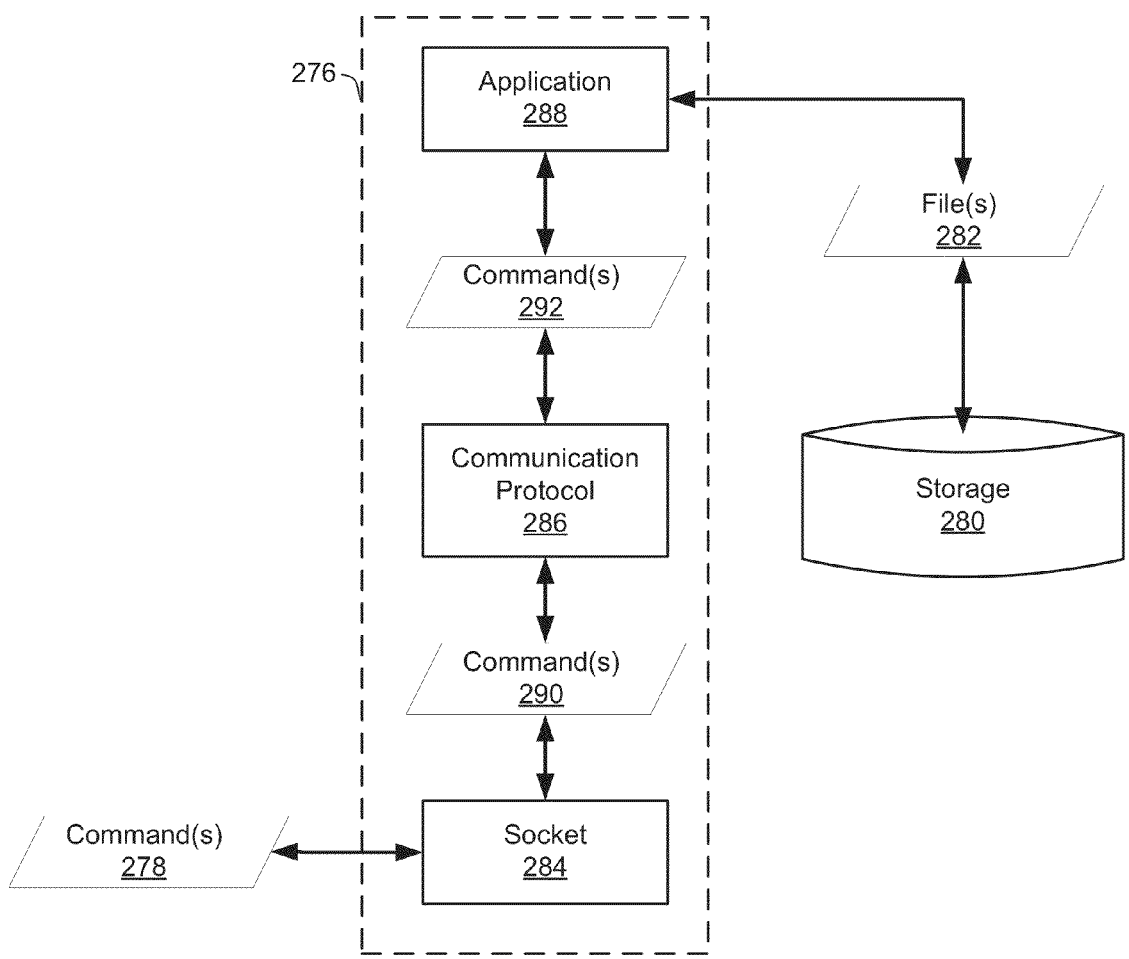

FIGS. 2A-2C are block diagrams illustrating communication device(s) and mobile device(s) that implement distributed storage techniques, according to one or more embodiments. In embodiments shown in FIGS. 2A-2C, the communication device is configured to perform mapping(s) of data/files specified by the host device to data/files stored by mobile device(s)/cloud storage. In other words, in embodiments shown in FIGS. 2A-2C, the communication device maps data/files and provides these files to the host device. As a result, the communication device allows user(s) to access data stored on mobile device(s) from almost any media host device that includes a communication port, such as a USB port.

FIG. 2A is a block diagram 200 that illustrates one embodiment of a distributed storage system for accessing data over a network. In FIG. 2A, a communication device 202 can provide access to files stored using a mobile device 204, such as by mapping these files to a file structure on the media host device. Communication device 202 doesn't require the host to run any additional software. Instead, communication device 202 allows a host to access data (stored using a mobile device) using standard communication protocols. For example, communication device 202 allows a USB-enabled host device to access a USB disk (e.g., communication device 202) using a USB mass storage class request. The USB disk can then access a smart device (e.g., mobile device 204) and read data from the smart device. The USB disk can then return this read data to the USB-enabled host, as specified by the USB mass storage class request. As a result, since the host device communicates with smart device 204 by using communication device 202, smart device 204 can appear as thumbdrive(s) (or other USB storage device(s)) coupled to the USB port of the host device.

In one embodiment, communication device 202 includes a host interface 208, a remote mapping layer 210, a communication protocol 212, and one or more sockets 214. Communication device can execute, such as by using one or more processors (see, e.g., FIG. 12) one or more of elements 208-214. In one embodiment, smart device 204 includes one or more sockets 220, a communication protocol 218, and an application 216. Smart device 204 can execute, such as by using one or more processors (see, e.g., FIG. 12) one or more of elements 216-220. Communication device 202 and smart device 204 can communicate using a network 206 (such as network 106 of FIG. 1). One implementation of one or more of communication layers 212 and 218 implements one or more communication protocols, such as HTTP, streaming protocols, such as HLS, and/or RTMP, among others.

In one embodiment, communication device 202 can connect via network 206 directly to cloud storage, such as cloud storage 114 of FIG. 1. In this implementation, one or more servers (of the cloud storage) can implement one or more of elements of smart device 204. As a result, communication device 202 (and thus the host device) can access data stored using the cloud storage.

FIG. 2B is a block diagram 250 that illustrates communication device 252 (e.g., that implements communication device 202) communicating with a host device 251 (e.g., using command(s) 254) and with a smart device (e.g., using command(s) 256), according to some embodiments. Communication device 252 includes a host interface 258, a remote mapping layer 260, a communication protocol 262, and one or more sockets 264.

Host interface 258 communicates, using commands, with host device 251. For example, host interface 258 can be implemented using a USB layer that can communicate with host 251 using USB commands 254. Host interface 258 may include a physical USB layer that implements individual commands and/or signals used by the USB protocol. Host interface 258 receives one or more commands 254 from host 251. If host 251 requests a data read, this data read can be communicated to smart device(s) (i.e., using command(s) 256). Next, once communication device 252 receives data (e.g., via commands 256) from smart device(s), host interface 258 can transmit the received data to host 251 using commands 254. If host 251 requests a data write, this data write can be communicated to smart device(s) (i.e., using command(s) 256). Next, once communication device 252 writes data (e.g., via commands 256), host interface 258 can transmit acknowledgement(s) of successful data write(s) to host 251 using commands 254.

Remote mapping layer 260 can receive one or more commands 266 from host interface 258. Remote mapping layer 260 (which may be implemented using a distributed FAT system (DFAT), described below) is operable to construct a remote file/directory mapping of files (that are stored using the smart device(s)). Once the remote mapping is setup, the communication device allows the host device to issue USB commands (such as MSC/MTP (Mass Storage device Class/Media Transfer Protocol) commands) for data access. In case of a read, remote mapping layer 260 can transmit command(s) 268 with the read request that includes location(s) of the data on the mobile device (and can also indicate which one(s) of many mobile device(s) should be accessed). In case of a write, remote mapping layer 260 can transmit command(s) 260 with the write request that includes location(s) on the mobile device where the data should be written (and can also indicate which one(s) of many mobile device(s) should be accessed).

Communication protocol layer 262 allows the host device to communicate with smart devices using USB commands, which are then translated into network commands. In some embodiments, once the remote mapping is done by the remote mapping layer, communication protocol layer 262 translates USB commands received from the host into protocol commands 270. In one implementation, such protocol commands 270 implement functionality of commands 254 that include location(s) on the mobile device where the data should be written (and can also indicate which one(s) of mobile device(s) should be accessed). For example, communication protocol layer 262 can translate USB commands from the host, e.g., the USB MSC/MTP commands, into network commands.

Socket layer 264 facilitates network communication over the network (e.g., network 106 of FIG. 1 and/or network 206 of FIG. 2A) between the communication device and the smart device(s). Socket layer 264 is operable to issue and receive network commands 256 to and from the smart device(s). Such network commands 256 can implement, such as by using a standard network commands, functionality of commands 254 that include location(s) on the mobile device where the data should be written (and can also indicate which one(s) of mobile device(s) should be accessed). For example, socket layer 264 can transmit and receive network commands 256 over the network using any network protocol, such as any variant, wired or wireless, of Ethernet, TCP/IP, UDP, etc.

FIG. 2C is a block diagram 275 that illustrates smart device 276 (e.g., that implements smart device 204) communicating with communication device (e.g., using command(s) 278), according to some embodiments. Smart device 276 includes one or more sockets 284, a communication protocol layer 286, and one or more application(s) 288. Smart device 276 can also store files and/or be able to access one or more files 282, such as from storage device(s) 280 and/or over a network, such as from storage cloud storage (see FIG. 1). In one implementation, cloud storage 114 can implement smart device 276, such as by virtualizing one or more of socket(s) 284, communication protocol layer 286, and application(s) 288.

Smart device's socket layer 284 can receive and issue network commands 278 from/to the communication device. For example, the smart device socket layer can transmit and receive network commands 278 (e.g., such as network commands 256) over the network using any network protocol, such as any variant, wired or wireless, of Ethernet, TCP/IP, UDP, etc.

Communication protocol layer 286 on smart device 276 can receive commands 290 from socket layer 284. These commands 290 (functionality of which may be originated at the host device) can be directed to accessing files that are either locally stored on the smart device(s), or accessible by the smart device(s), such as from the cloud storage. Communication protocol layer 286 can translate the received commands 290 into application commands 292, i.e., commands that can be processed by the application(s).

Application layer 288 on smart device 276 can interpret application commands 292, and retrieve the requested data and/or file(s) from the local storage (e.g., storage local to smart device 286, or storage 280 accessible by mobile device 276) and/or cloud storage. As a result, application 288 can communicate with elements of the communication device via the network (e.g., wireless Ethernet, USB, Bluetooth) using the communication protocol (e.g., as implemented by communication protocol layer 286). In one embodiment, application 288 and remote mapping layer 260 of the communication device can exchange file/directory information, e.g., regarding the files and/or data. This file/directory information can be used by the communication device (e.g., by the remote mapping layer) side to construct the remote file/directory mapping.

Figure 3A:
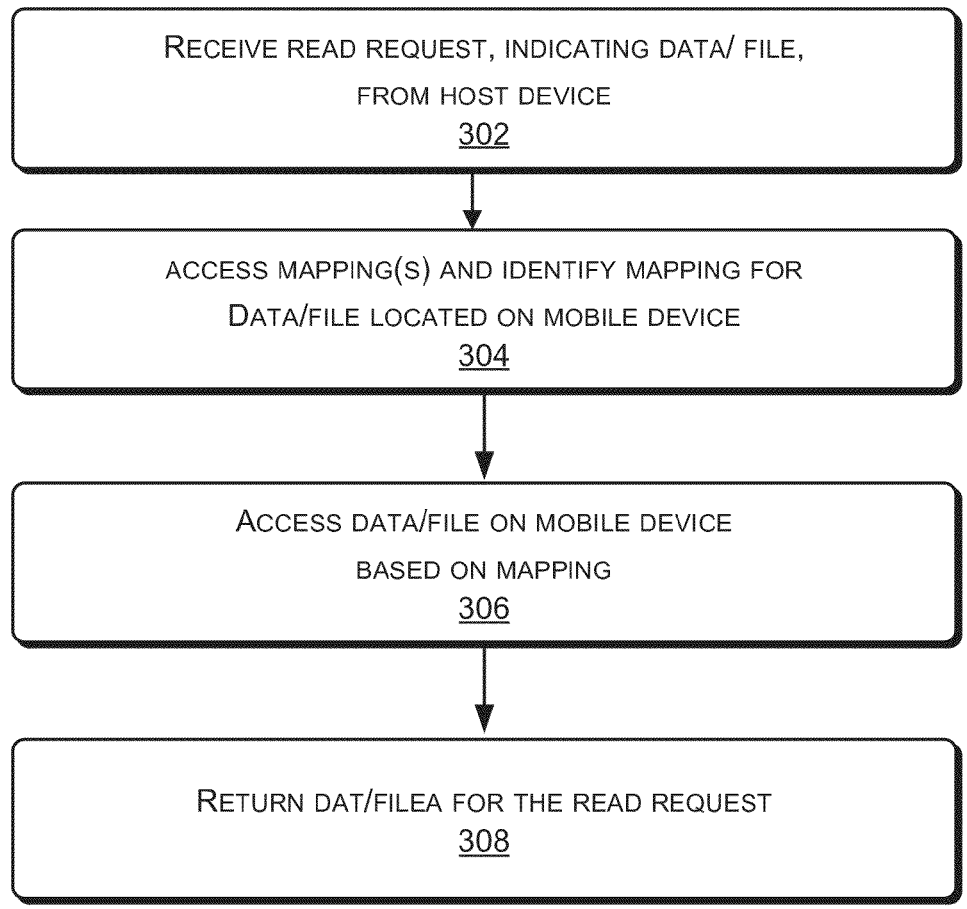
FIGS. 3A-3B are flowcharts for operation of communication device(s) and mobile device(s) that implement distributed storage techniques, according to one or more embodiments.

FIG. 3A is a flowchart 300 of a method for operation of communication device(s) and mobile device(s) that implement distributed storage techniques, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 300 is described with reference to variations of the elements described in connection with FIGS. 1 and 2A-2C.

In element 302, the communication device receives a read request that indicates data/file(s) from a host device, according to one embodiment. For example, with reference to FIG. 2B, host interface 258 receives command(s) 254 from host 251.

In element 304, the communication device accesses mapping(s) and identifies one or more mappings for the data/file, according to one embodiment. The communication device can also identify the smart device (e.g., smart device 108(3) out of smart devices 108(1)-108(3) and could storage 114) where the file/data is stored. For example, with reference to FIG. 2B, remote mapping layer 260 accesses mappings, and optionally also identifies the mobile device(s). It is noted that remote mapping layer 260 can also identify cloud storage as storing the data/file(s).

In element 306, the communication device accesses data/file(s) on the mobile device(s) based on the mapping, according to one embodiment. For example, socket layer 264 can access the mobile device(s) (and/or cloud storage) using commands 256.

In element 308, the communication device returns data to the read request, according to one embodiment. For example, the socket layer 264 can receive commands 256 that include the data/file(s). Once the data/file(s) are processed by communication device 252 (e.g., forwarding the data/file through various communication layers of communication device 252), host interface 258 can send commands 254 to host 251.

Figure 3B:
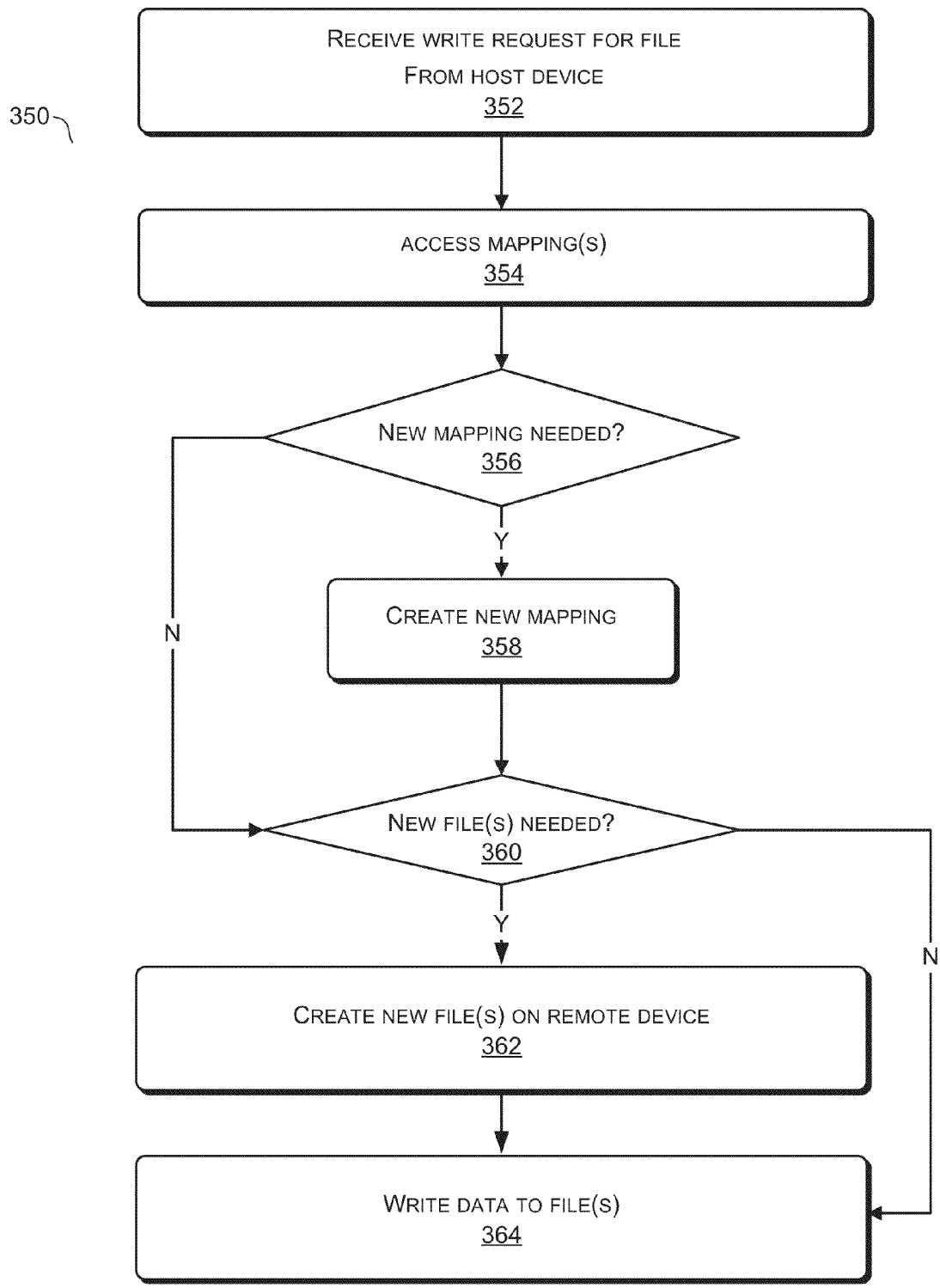

FIG. 3B is a flowchart 350 of a method for operation of communication device(s) and mobile device(s) that implement distributed storage techniques, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 350 is described with reference to variations of the elements described in connection with FIGS. 1 and 2A-2C.

In element 352, the communication device receives a write request, that indicates data/file(s) to be written, from a host device, according to one embodiment. For example, with reference to FIG. 2B, host interface 258 receives command(s) 254 from host 251.

In element 354, the communication device accesses mapping(s) and identifies one or more mappings for the data/file, according to one embodiment. The communication device can also identify the mobile device (e.g., mobile device 108(3) out of mobile devices 108(1)-108(3)) where the file/data is to be stored. For example, with reference to FIG. 2B, remote mapping layer 260 accesses mappings, and optionally also identifies the mobile device(s). It is noted that remote mapping layer 260 can also identify cloud storage as storing the data/file(s). In element 354, the communication device can also determine that no mapping has yet been created for the data/file(s) received from the host.

In element 356, the communication device determines whether new mapping(s) are needed. For example, remote mapping layer 260 can determine that a mapping already exists, e.g., in case a write modifies data/file that already exists and/or has associated mapping(s). However, remote mapping layer 260 can instead determine that a mapping does not yet exists, e.g., in case a write modifies data/file that already exists but does not have associated mapping(s), or in case a write is configured to write data/file that does not yet exist and does not have associated mapping(s). In element 358, if in element 356 it is determined that new mapping(s) are needed, the remote mapping layer can create new mapping(s). The mapping(s) can indicate the remote device(s) for the data/file(s), as well as location in each remote device(s) (or cloud storage) where the data/files(s) are to be stored.

In element 360, the communication device determines whether new file(s) are needed. For example, remote mapping layer 260 can determine that for existing mapping(s), new file(s) should be created. For example, if the write request indicates new data/file(s), then both new mapping(s) and file(s) can be created. In element 362, if in element 360 it is determined that new file(s) are needed, the remote mapping layer can indicate that new file(s) should be created. This new file(s) indication can be communicated to the remote device(s), such as using commands 268, 270, and/or 256.

In element 364, the communication device can write data to file(s). For example, socket(s) 264 can issue command(s) 256 that indicate data/file(s) to be written at location(s) at remote device(s) (and/or cloud storage) as indicated by the mapping(s).

In one embodiment, once the remote mapping is setup (e.g., by the remote mapping layer, such as remote mapping layer 260), the communication device can attach, via USB, to the host, and then allow the host to issue USB commands (e.g., MSC/MTP commands) for data (e.g., media files). In another embodiment, the communication device can be connected to the host prior to the mapping being done, i.e., the mapping step may be performed during and/or after the communication device is physically connected to the host.

By using the remote mapping, the communication device can translate the USB commands (e.g., USB mass storage commands) issued by the host to network commands that are send to the mobile device(s). In one implementation, these network commands can include network protocol commands created by communication protocol layer 262 that are then sent using network 106 (such as Ethernet). The network command(s) may then be sent, using the socket, to the smart device(s).

The smart device can process the received network command(s) and provide the translated network command(s) (e.g., as application commands 292) to the application. The application (e.g., application 288) can interpret the application command(s) and then retrieve any pertinent data (i.e., that is referenced by the application command(s)) from the local and/or remote storage (e.g., storage 280) associated with that smart device. This retrieved data (e.g., data/file(s) 282) can then be packaged (e.g., by the application and/or communication protocol layers) into a network command (e.g., command response 290) that includes at least a portion of the retrieved data. This command response can then be sent via the network (e.g., using network command(s) 278/256) using the network sockets on both the smart device and the communication device. The communication device can then process the command response (e.g., as included in the network commands). The communication device can provide the retrieved data (from the processed command response) to the host. The host then, by accessing the communication device that implements remote the mapping layer, receives the retrieved data as if that retrieved data was located directly on the communication device.

As a result, the communication device allows transfer of content from the smart device(s) to the host. This content can be locally stored on the smart device(s). The smart device(s) can access this content from the web, such as by streaming this content from the cloud storage using Ethernet (such as shown by smart device 108(3) accessing files and/or data from cloud storage 114 of FIG. 1). The smart device(s) can access the internet through an additional networking technology (e.g. 3G/4G on a smart phone).

In one embodiment, the smart device(s) can also access the internet using the communication device itself. For example, with reference to FIG. 1, smart device 108(2) and communication device 104(1) communicate over network 106 (e.g., a WiFi network). Smart device 108(2) can then access cloud storage 114 using network 106, i.e., the same network connection as the one already used by the communication device. In one embodiment, when accessing the access point directly, the communication device can still use the application on the smart device for configuration and file management.

In another embodiment, the communication device can access, via the internet, a virtualized smart device that is implemented by a server (e.g., such as a server that is a part of cloud storage 114). In this embodiment, such a server can virtualize (e.g., implement in software) a smart device. The communication device (e.g., communication device 104(2)) can connect to the virtualized smart device over network 106 by communicating with the virtualized smart device using network commands in substantially the same manner as described above. The virtualized smart device would respond using network commands in the same manner as described above. In one example, the virtualized smart device would offer access to cloud storage and other network resources. The virtualized smart device would then give the host capability to access, using a network (such as WiFi), direct access to this cloud storage 114 and/or other network resources.

The smart device may be also connected to the communication device via an access point, where that access point also has internet connectivity. The communication device can then either pull content from the internet through the smart device(s), or through an access point directly.

The communication device can be setup to connect to multiple smart devices. Each smart device may show up as a different folder on the communication device, and thus as a different folder to the host. Each of the smart device(s) can also be connected to multiple communication devices through an Access Point. As a result, each smart device can provide content to multiple hosts. The remote mapping layer can then select the smart device(s) to access (e.g., to read or write data).

Figure 4A:
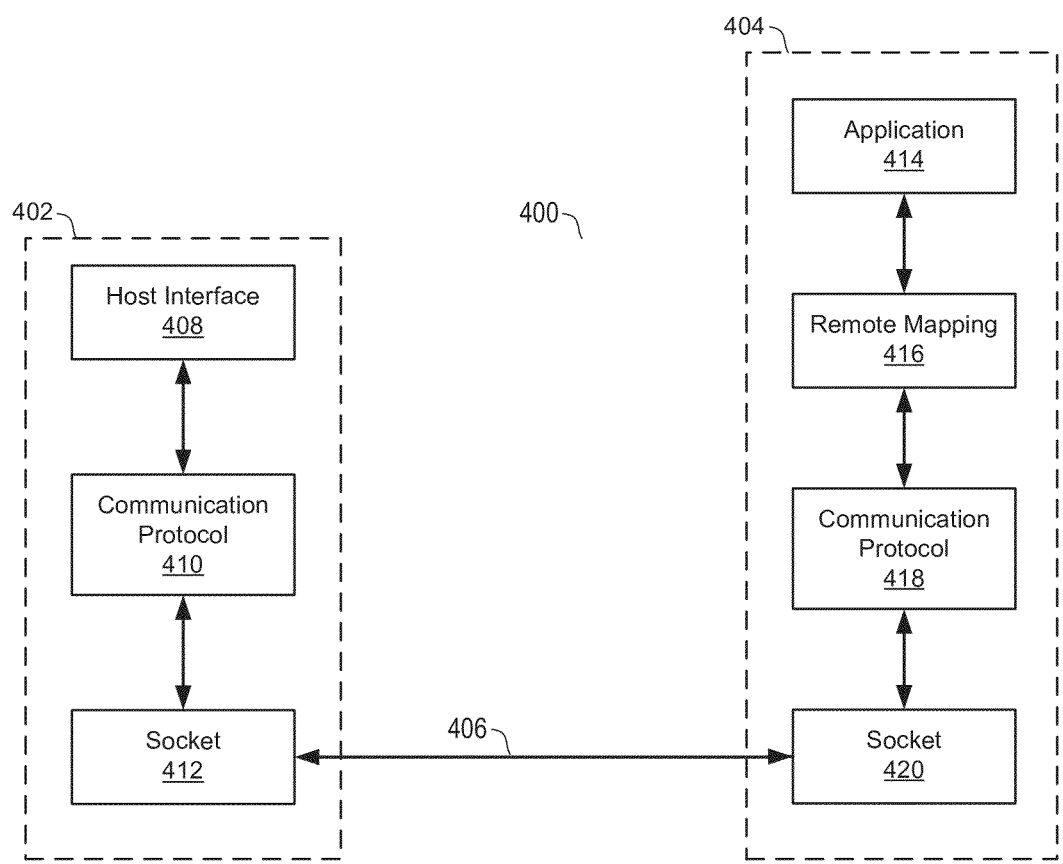
FIGS. 4A-4C are block diagrams illustrating communication device(s) and mobile device(s) that implement distributed storage techniques, according to one or more embodiments.
Figure 4B:
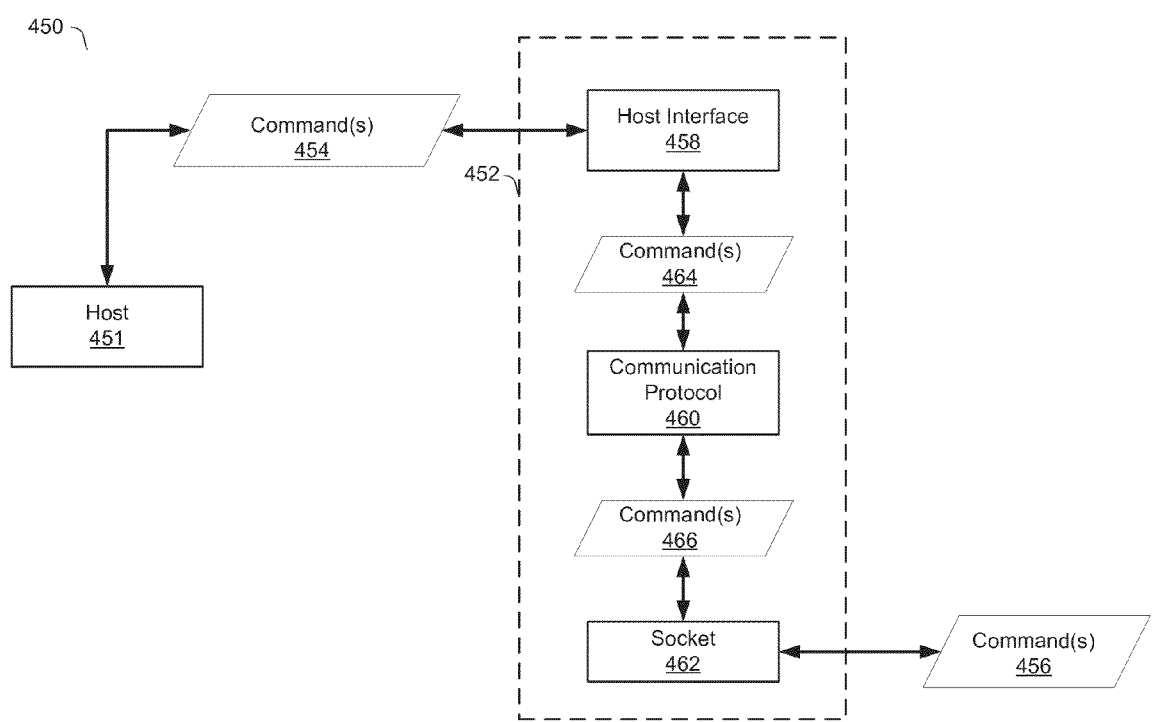
Figure 4C:
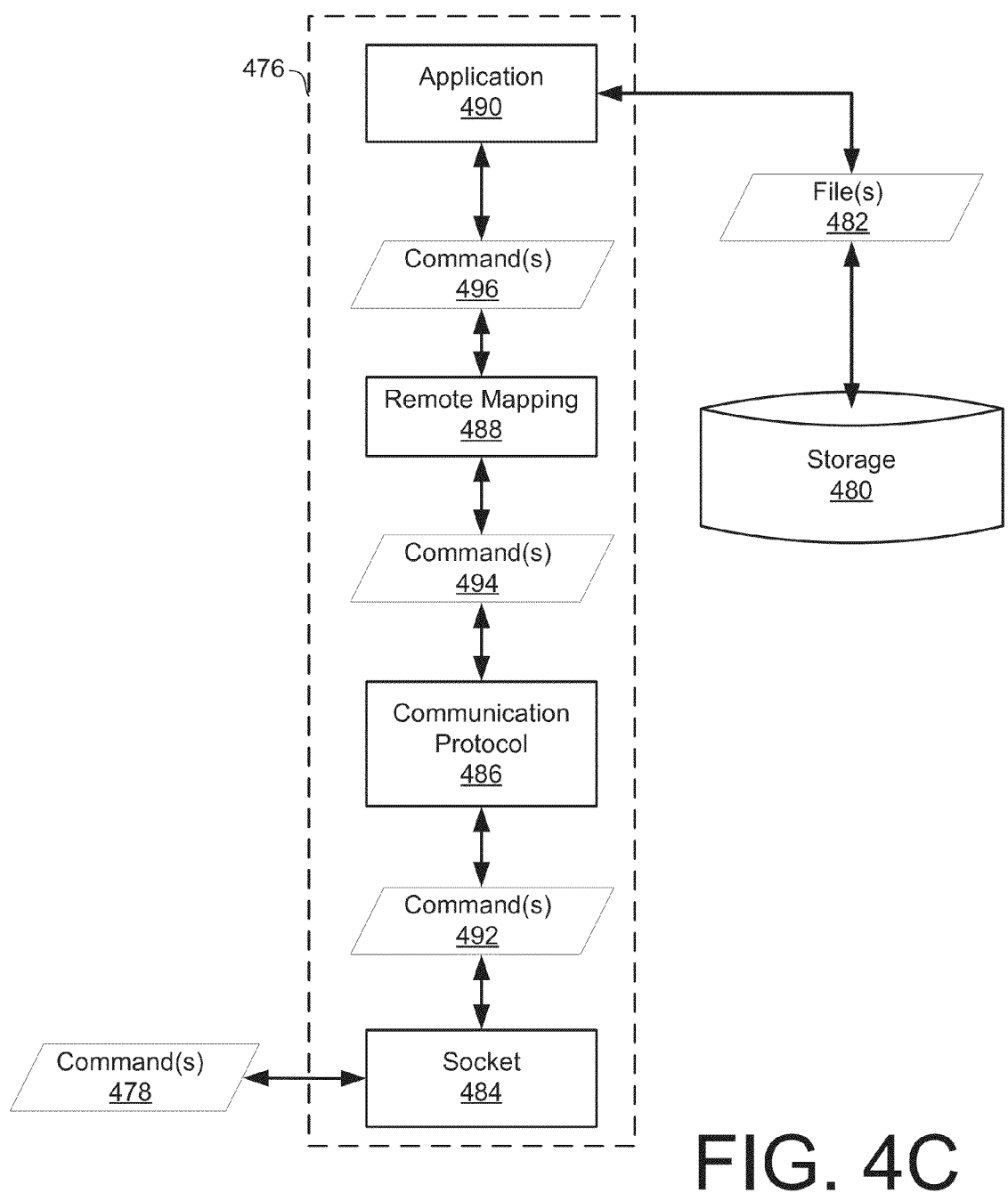

FIGS. 4A-4C are block diagrams illustrating communication device(s) and mobile device(s) that implement distributed storage techniques, according to one or more embodiments. In embodiments shown in FIGS. 4A-4C, the mobile device is configured to perform mapping(s) of data/files specified by the host device to data/files stored by mobile device(s)/cloud storage. In other words, in embodiments shown in FIGS. 4A-4C, the mobile device(s) can map files and provide these mapped files to the communication device. As a result, the communication device allows user(s) to access data stored on mobile device(s) from almost any media host device that includes a communication port, such as a USB port. In one embodiment, the communication device of FIGS. 4A-4C operates similar to that of FIGS. 2A-2C, except that the mapping layer is implemented by the smart device instead of the communication device.

In one embodiment, communication device 402 includes a host interface 408, a communication protocol 410, and one or more sockets 412. Communication device can execute, such as by using one or more processors (see, e.g., FIG. 12) one or more of elements 408-412. In one embodiment, smart device 404 includes one or more sockets 420, a communication protocol layer 418, a remote mapping layer 416, and an application 414. Smart device 404 can execute, such as by using one or more processors (see, e.g., FIG. 12) one or more of elements 414-420. Communication device 402 and smart device 404 can communicate using a network 406 (such as network 106 of FIG. 1). One implementation of one or more of communication layers 410 and 418 implements a communication protocol that uses protocol commands, such as are generated and interpreted by the communication layers. Such protocol commands can include mappings, host requests, data access, and/or data, among others.

FIG. 4B is a block diagram 450 that illustrates communication device 452 (e.g., that implements communication device 402) communicating with a host device 451 (e.g., using command(s) 454) and with a smart device (e.g., using command(s) 456), according to some embodiments. Communication device 452 includes a host interface 458, a communication protocol 460, and one or more sockets 462. However, in this embodiment, there is no exchange of file/directory information between the communication device and the mobile device(s). Instead, communication device 452 can receive commands (such as SCSI commands), from host 451. For example, communication device 452 can receive commands 454 that include the SCSI commands, or any other disk/file access commands, from host 451 via the host USB layer. Host interface layer 458 can generate commands 464 based on the access commands 454. Communication protocol layer 460 can then translate access commands 464 to communication protocol commands 466. In one implementation, both access commands 464 and protocol commands 466 reference data/files as specified by host commands 454 (e.g., without any mapping/location translations). Socket layer 462 can then generate network commands 456, and transmit the network command(s) 456 to the smart device(s).

FIG. 4C is a block diagram 475 that illustrates smart device 476 (e.g., that implements smart device 404) communicating with communication device (e.g., using command(s) 478), according to some embodiments. Smart device 476 includes one or more sockets 484, a communication protocol layer 486, a remote mapping layer 488, and one or more application(s) 490. Smart device 476 can also store files and/or be able to access one or more files 482, such as from storage device(s) 480 and/or over a network, such as from storage cloud storage (see FIG. 1). In one implementation, cloud storage 114 can implement smart device 476, such as by virtualizing one or more of sockets 484, communication protocol layer 486, remote mapping layer 488, and/or application(s) 490.

Smart device's socket layer 484 can receive and issue network commands 478 to/from the communication device. For example, the smart device socket layer can transmit and receive network commands 478 (e.g., such as network commands 456) over the network using any network protocol, such as any variant of, wired or wireless, Ethernet, TCP/IP, UDP, etc.

Communication protocol layer 486 on smart device 476 can receive commands 492 from socket layer 484. These commands 492 (functionality of which may be originated at the host device) can be directed to accessing files that are still specified as being located on the communication device (i.e., since no mapping has been performed at this time). Communication protocol layer 486 can translate the received commands 492 into communication protocol commands 494, i.e., commands that can be processed by the application(s).

Remote mapping layer 488 can receive one or more commands 494 from communication protocol layer 486. Remote mapping layer 488 (which may be implemented using a distributed FAT system (DFAT), described below) is operable to construct a remote file/directory mapping of files (that are stored using the smart device(s)). Once the remote mapping is setup, the smart device can be used, with a communication device, to receive commands from the host (such as USB MSC/MTP commands) for data/file access. In case of a read, remote mapping layer 488 can transmit command(s) 496 with the read request that includes location(s) of the data on the mobile device. In case of a write, remote mapping layer 488 can transmit command(s) 496 with the write request that includes location(s) on the mobile device where the data should be written. In one implementation, commands 496 include application commands 496, i.e., commands that can be processed by the application(s). In one embodiment, the communication device can exchange file/directory information, e.g., regarding the files and/or data, with the smart device. This file/directory information can be used by the communication device (e.g., by the remote mapping layer) side to construct the remote file/directory mapping.

Application layer 490 on smart device 476 can interpret application commands 496, and retrieve the requested data and/or file(s) from the local storage (e.g., storage local to smart device 476, or storage 480 accessible by mobile device 476) and/or cloud storage.

Figure 5A:
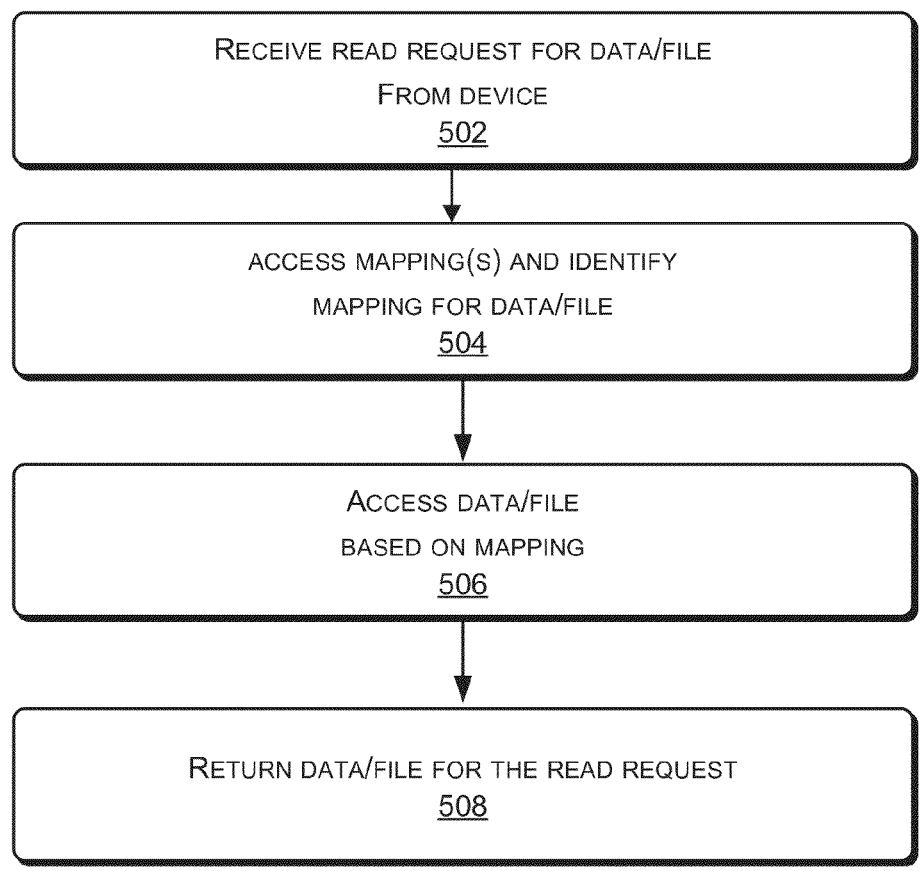
FIGS. 5A-5B are flowcharts for operation of communication device(s) and mobile device(s) that implement distributed storage techniques, according to one or more embodiments.

FIG. 5A is a flowchart 500 of a method for operation of communication device(s) and mobile device(s) that implement distributed storage techniques, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIGS. 1 and 4A-4C.

In element 502, the smart device receives a read request that indicates data/file(s) from a communication device, according to one embodiment. For example, with reference to FIG. 4B, socket 484 receives command(s) 478 from the communication device. Commands 478 include data/file access that was received by a communication device from the host device. However, commands 478 include read access that indicates file/data as being located on the communication device (i.e., location(s) of file/data as specified by the host device).

In element 504, the smart device accesses mapping(s) and identifies one or more mappings for the data/file, according to one embodiment. For example, with reference to FIG. 4B, remote mapping layer 488 accesses mappings. It is noted that remote mapping layer 488 can also identify cloud storage as storing the data/file(s).

In element 506, the smart device accesses data/file(s) on the smart device(s) based on the mapping, according to one embodiment. For example, socket layer 462 can access the mobile device(s) (and/or cloud storage) using commands 456.

In element 508, the smart device returns data/files according to the read request, according to one embodiment. For example, socket layer 484 can receive commands 492 that include the data/file(s). Socket layer 484 can send commands 478 to the communication device. The communication device can then communicate the data/file(s) to the host.

Figure 5B:
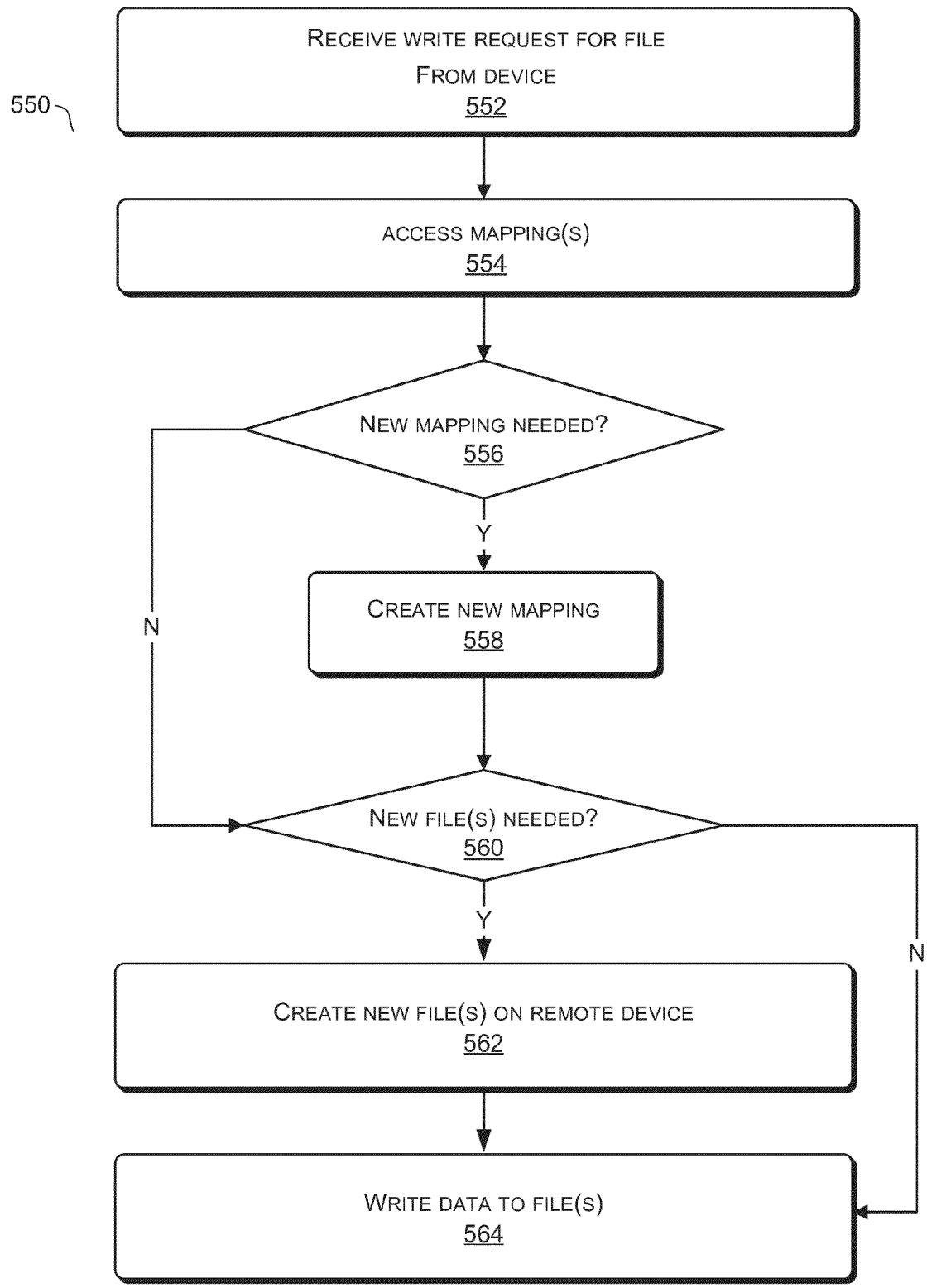

FIG. 5B is a flowchart 550 of a method for operation of communication device(s) and mobile device(s) that implement distributed storage techniques, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 550 is described with reference to variations of the elements described in connection with FIGS. 1 and 4A-4C.

In element 552, the smart device receives a write request, which can indicate data/file(s) to be written, from a communication device, according to one or more embodiments. For example, with reference to FIG. 4B, socket 484 receives command(s) 478 from the communication device. Commands 478 include data/file access that was received by a communication device from the host device. However, commands 478 include write access that indicates file/data as being located on the communication device (i.e., location(s) of file/data as specified by the host device).

In element 554, the smart device accesses mapping(s) and identifies one or more mappings for the data/file, according to one embodiment. For example, with reference to FIG. 4C, remote mapping layer 488 accesses the mapping(s). It is noted that remote mapping layer 488 can also identify cloud storage as storing the data/file(s). In element 554, the smart device can also determine that no mapping has yet been created for the data/file(s) received from the communication device.

In element 556, the smart device determines whether new mapping(s) are needed. For example, remote mapping layer 488 can determine that a mapping already exists, e.g., in case a write modifies data/file that already exists and/or has associated mapping(s). However, remote mapping layer 488 can instead determine that a mapping does not yet exists, e.g., in case a write modifies data/file that already exists but does not have associated mapping(s), or in case a write is configured to write data/file that does not yet exist and does not have associated mapping(s). In element 558, if in element 556 it is determined that new mapping(s) are needed, the remote mapping layer can create new mapping(s). The mapping(s) can indicate the remote device(s) for the data/file(s), as well as location in remote device(s) (or cloud storage) where the data/files(s) are to be stored.

In element 560, the smart device determines whether new file(s) are needed. For example, remote mapping layer 488 can determine that for existing mapping(s), new file(s) should be created. For example, if the write request indicates new data/file(s), then both new mapping(s) and file(s) can be created. In element 562, if in element 560 it is determined that new file(s) are needed, the remote mapping layer can indicate that new file(s) should be created.

In element 564, the smart device can write data to file(s). For example, application 490 can write file(s) 482 to be written at location(s) at storage 480 (and/or cloud storage) as indicated by the mapping(s).

In the embodiments described in FIGS. 4A-4C and 5A-5B, the smart device can implement the remote mapping layer (e.g., DFAT). The remote mapping layer can process the received network commands that are transmitted by the communication device. The network commands can include the SCSI commands (e.g., as received over the USB network from the host). The smart device may access (e.g., create/delete/edit) files as indicated by the network commands. As described above with reference to FIGS. 1 and 4A-4C, these files that are accessed by the smart device can be stored locally and/or remotely from the smart device.

As a result, the communication device allows easy access (e.g., read and write) to files that may be stored (or easily accessed) by the smart device, since the smart device maintains the remote mapping. The remote mapping can easily be synchronized with any physical file writes. The communication device doesn't require any proprietary software on host, because the host may view the communication device as a storage device, e.g., either a traditional mass storage device or an MTP device. In some embodiments, the communication device can connect to multiple smart devices.

In general, the use of methods of FIGS. 3A and 3B, and/or FIGS. 5A and 5B allow the smart device to become a storage device. It allows for content to be pulled from and/or stored on the smart device. The communication device can either be attached externally to the host or integrated internally. This allows for a lot of different connection types (as seen in FIG. 1), for example:

Host (e.g., TV) 102(1)↔ smart device 108(1),

TV 102(1)↔ smart device implemented (e.g., virtualized) by cloud storage 114,

TV 102(1)↔ smart device↔ data stored by cloud storage 114, camera 102(3)↔ phone 108(1), video camera 102(3)↔ phone 108(1), camera 102(3)↔ computer 108(3), camera 102(3)↔ hard drive (or remote storage) 108(7), among others.

Figure 6:
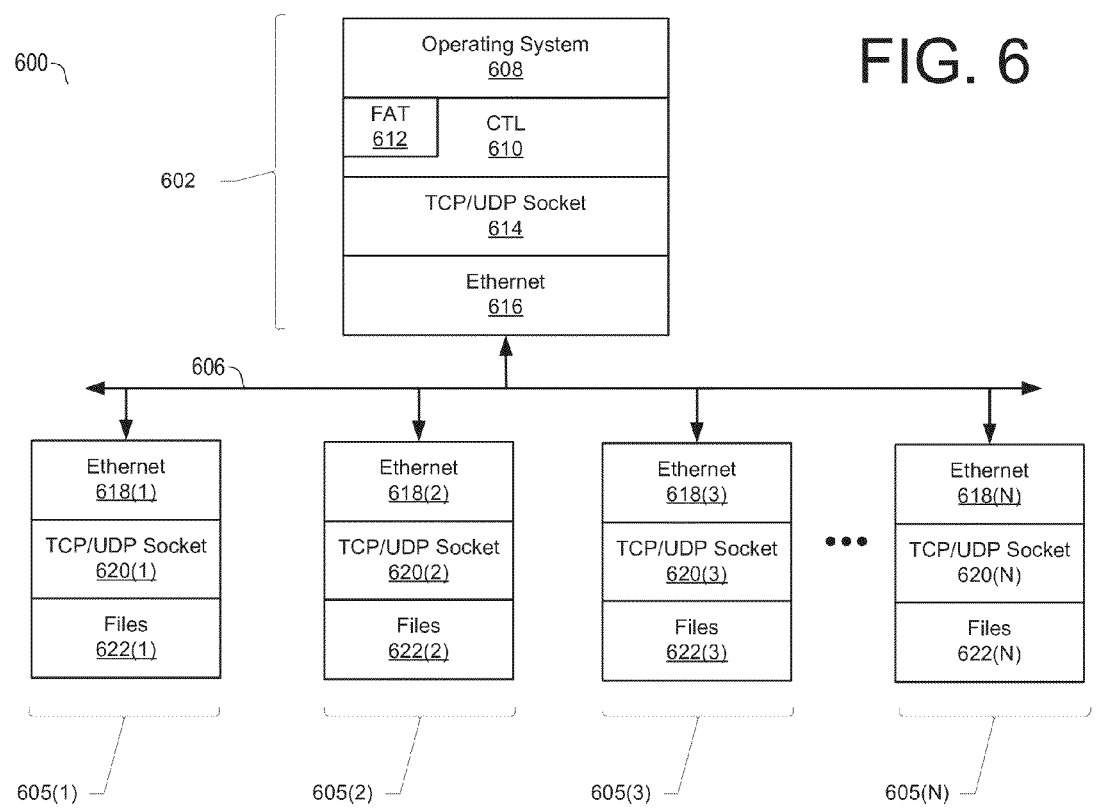
FIG. 6 is a block diagram illustrating various communication layers of a host/communication device that is coupled to smart devices, according to one or more embodiments.

FIG. 6 illustrates one or more embodiments of using a distributed FAT (File Access Table) technology, also referred to as DFAT. In one embodiment, FIG. 6 shows a communication device 602, such as communication device 102(1)-102 (4) of FIG. 1 and one or more smart devices 605(1)-605(N), such as smart devices 108(1)-108(3) of FIG. 1. In one embodiment, communication device 602 includes an operating system (OS) 608, Content Transport Layer (CTL) 610, a FAT module 612, socket layer 614 (such as TCP/UDP, among others), and a network module 616 (such as for wired/wireless network). Communication device 602 can connect to the smart devices via network 606. It is understood that with reference to FIG. 6, and other Figs, the term layer and/or module can refer to software, hardware, firmware, and/or any combination of these. In one embodiment, each smart device 605(1)-605(N) includes network module 618(1)-618(N) (such as for wired/wireless network), socket 620(1)-620(N) (such as TCP/UDP, among others), and files 622(1)-622(N), respectively. In one embodiment, smart device 605(1)-605 (N) can be virtualized by cloud storage. In one embodiment, smart device 605(1)-605(N) can implement network module 618(1)-618(N) and socket 620(1)-620(N), but one or more of files 622(1)-622(N) are stored (and thus accessed by) using cloud storage.

In another implementation, the modules shown by element 602 can be implemented across a host device and a communication device. For example, the communication device can be built-into the host, and OS 608 can execute on the host device. In this case, the OS of the host can access the FAT/CTL layer directly, i.e., without sending USB (or other commands) to the host interface of the communication device. In some implementations, the communication device may be eliminated altogether, such as when the DFAT technology is implemented by the host. In these implementations, the host would access multiple smart devices directly, e.g., without using the communication device.

The remote mapping layers of the preceding Figs. may be implemented using a FAT/CTL layer (i.e., DFAT) described herein. The communication protocol layers of the preceding Figures may be implemented by the CTL and/or the socket layer. The socket layers of the preceding Figs. may be implemented by the socket and/or the Ethernet layer. It is understood that these layers are exemplary only, and other implementations are contemplated. For example, the communication device may use a different network, such as wireless USB, WiFi, Bluetooth, Firewire, etc, without deviating from the spirit of using DFAT and/or the methods described herein. For example, the socket and/or network modules can be easily implemented using Bluetooth communication layers, and the DFAT implementation would still apply to the communication device and/or smart device(s).

Distributed FAT allows file system independent access of data arranged as files on remote smart device(s). This method of file access eliminates the need for the operating system to understand proprietary remote file access protocols/file systems. To the operating system it appears like the entire disk is residing as a single entity formatted as a FAT file system (e.g., FAT12/16/32). However, only the file allocation tables are present on the local device. OS 608 accesses files that are distributed among mobile devices (e.g., smart device(s)). DFAT implementation essentially changes the notion of how a disk is perceived. In summary, the OS issues data/file access commands to access content that is located on the disk (i.e., where the FAT tables are located). However, with distributed FAT, the data is not located on the disk. Instead, data is actually fetched using the socket layers that eventually access data from the mobile devices.

Thus, CTL 610 is responsible for making the data/file appear as being present on the same disk. The CTL may map the cluster data to the remote files. In some embodiments, the CTL uses a data structure, such as a list, to maintain the cluster numbers assigned to each file. When the operating system issues a read for a cluster number that belongs to a file, the CTL intercepts the read request from going to the disk, and calculates the file offset requested by the operating system. The CTL then uses this offset to read the file over the network using the correct offset. When the data becomes available (such as by being read from smart device(s)), the CTL provides this data to the operating system. The behavior of the FAT to the OS is substantially the same as if this data was read from a local disk.

For example, clusters no. 5 to cluster no. 100 may be assigned to a file named "test.txt". Also, the disk may have 4 sectors per cluster, and the cluster size is 512 byte. This means that disk offset (5*4*512) is the starting offset of the file test.txt. The end offset is going to be (100*4*512). When the OS issues a read for data that lies between the two above mentioned offsets, the CTL calculates that the read from the OS refers to the file test.txt. The CTL may calculate the offset of the requested data (i.e., inside the file.txt) by subtracting the start offset from the requested offset. For example, start offset=(5*4*512)=10K
end offset=(100*4*512)=200K
Offset inside file.txt=Disk offset−start offset=Disk offset−10K Once this offset is calculated by the CTL, the CTL may issue a command, such as by using a TCP socket, to the remote smart device. For example, the issued command may be one or more network command(s) for a traditional file "seek" to the calculated offset inside the file, for a read of the data, and for returning the read data to the CTL. When data becomes available to the CTL, the CTL may provide this data to the OS.

As there could be many different smart devices with mapped files, the CTL may maintain a mapping of which socket connection it needs to access in order to fetch a file. This mapping that includes information on the proper socket connection lets the CTL know which device has the file that is being mapped. For the above mentioned example, the CTL would include a mapping that the file being accessed is located on Device 2. As a result, the CTL should use socket 2 to retrieve the file, such as by issuing a network command on socket 2.

There are benefits for a "network file system independent" mechanism to access data. For example, the architecture of traditional OS's with built in FAT file system understanding does not change. Also, USB mass storage class capable devices can access data residing on network directly, as if a disk with data is physically plugged into a USB drive.

Figure 7:
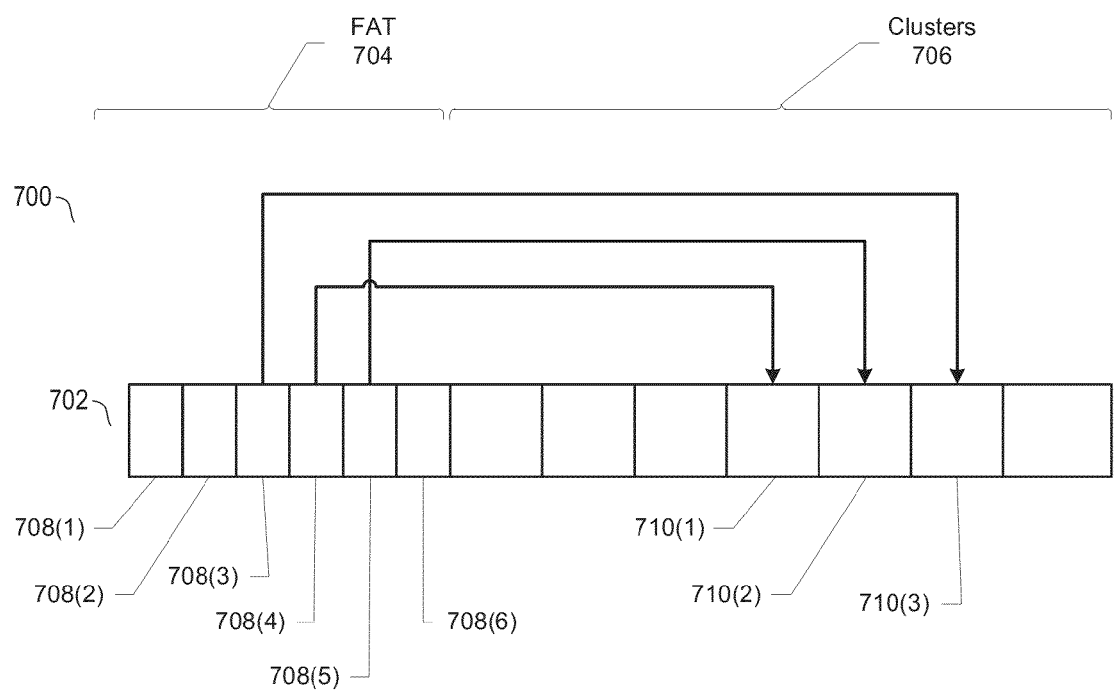
FIGS. 7 and 8 illustrate distributed FAT topology, according to one or more embodiments.

FIG. 7 illustrates use of a typical FAT. On one level, a traditional disk can use two components. First, a disk requires a method of arranging data in the disk called a file allocation table (FAT) 704. This method uses data structures 702 that contain location, names and other properties of data residing on the disk, such as by using FAT entries 708(1)-708(6). Second, the disk contains the data itself located in the form of files, such as shown by clusters 706. The data can be accessed by applications, such as an OS, by using the FAT. Typically, both the FAT and the data are physically located on the same device. Files 710(1)-710(3) can be indicated by FAT entries 708(3)-708(5).

In other words, FIG. 7 illustrates how cluster mapping is done in traditional FAT. On a high level, each data entry in the FAT corresponds to one cluster on the disk. Typically, an application, such as an OS, accesses data at an offset. That offset may be mapped, using the FAT, to a cluster on a disk.

Figure 8:
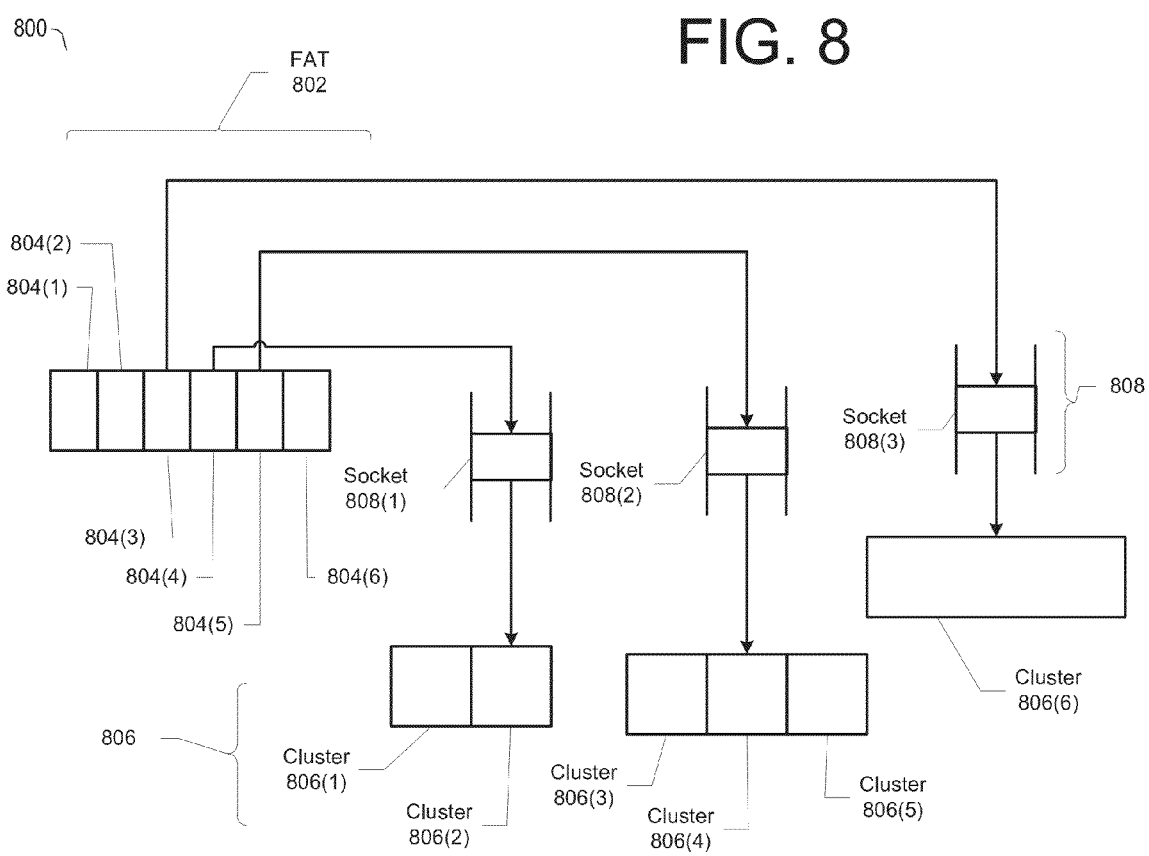

FIG. 8 illustrates operation of Distributed FAT, according to some embodiments. Distributed FAT does not require that the two above mentioned building blocks of the disk need to be physically located on the same device (i.e., as shown in FIG. 7). Instead, the disk can be divided between two or more devices.

As shown in FIG. 8, the DFAT system includes FAT 802, sockets 808, and clusters 806. Each of the FAT 802, sockets 808, and clusters 806 can be located on different devices, such as on communication device(s) and smart device(s). For example, the FAT entries can be implemented by FAT 612 and CTL 610. Sockets 808 can be implemented by socket layer 614. Clusters 806 can be implemented by remote devices 605(1)-605(N). In one implementation, clusters 806 can be implemented by cloud storage.

FAT 802 can include multiple FAT entries, such as FAT entries 804(1)-804(5). Sockets 808 can include multiple sockets, such as sockets 808(1)-808(3). Clusters 806 can include multiple clusters, such as clusters 806(1)-806(6). In some embodiments, FAT element 802 of DFAT shown in FIG. 8 can contain additional elements over the FAT shown in FIG. 7. For example, FAT entries 804(1)-804(6) can contain mappings such that indicate socket(s) that correspond to each FAT entry. As shown, FAT entry 804(3) contains a mapping that maps to socket 808(2). Socket 808(2) (such as which can be implemented by the socket layer of a communication device) is associated with cluster 806(4), where cluster 806(4) can contain the data/file(s) indicated by an original data/file access command from the host.

The file allocation table (FAT) may be located on the same physical device as an entity that is accessing the data (e.g., an OS), or it can be located on a communication device that is coupled to the host (e.g., as shown in FIG. 1). However, the data, which may be arranged into files, may be distributed (e.g., using clusters 806(1)-806(6) across many different devices (e.g., the smart device(s)). These devices, including the smart devices and the communication device(s) that contain the FAT/OS, can be connected using a network, such as a wired/wireless Ethernet, Bluetooth, Firewire, etc.

In other words, FIG. 8 shows how distributed FAT may map clusters to files using socket connections. As shown, each entry in the FAT maps to one socket. However, in other embodiments, each FAT entry can map to two or more sockets. Each socket, in turn, can be associated with, and/or access, one or more clusters. In one embodiment, the FAT entry and a mapped socket are implemented on a single device, such as a communication device of FIG. 1. In another embodiment, the FAT entry and mapped socket(s) are implemented on single device, such as a host with a built-in DFAT implementation (e.g., where at least a portion of the communication device is built into the host device), or a single communication device. In one embodiment, the FAT entry and mapped socket(s) are located on separate devices.

In one embodiment, each of clusters 806 may be located on a separate smart device. For example, the FAT table and the sockets may be located on a communication device. In accordance with this example, a FAT entry may be mapped to a particular socket. This socket may in turn be configured to access a cluster located on a smart device. This socket may use, for example, TCP/IP, to access data from this cluster. This data is then returned to the application requesting it, such as an OS.

Figure 9:
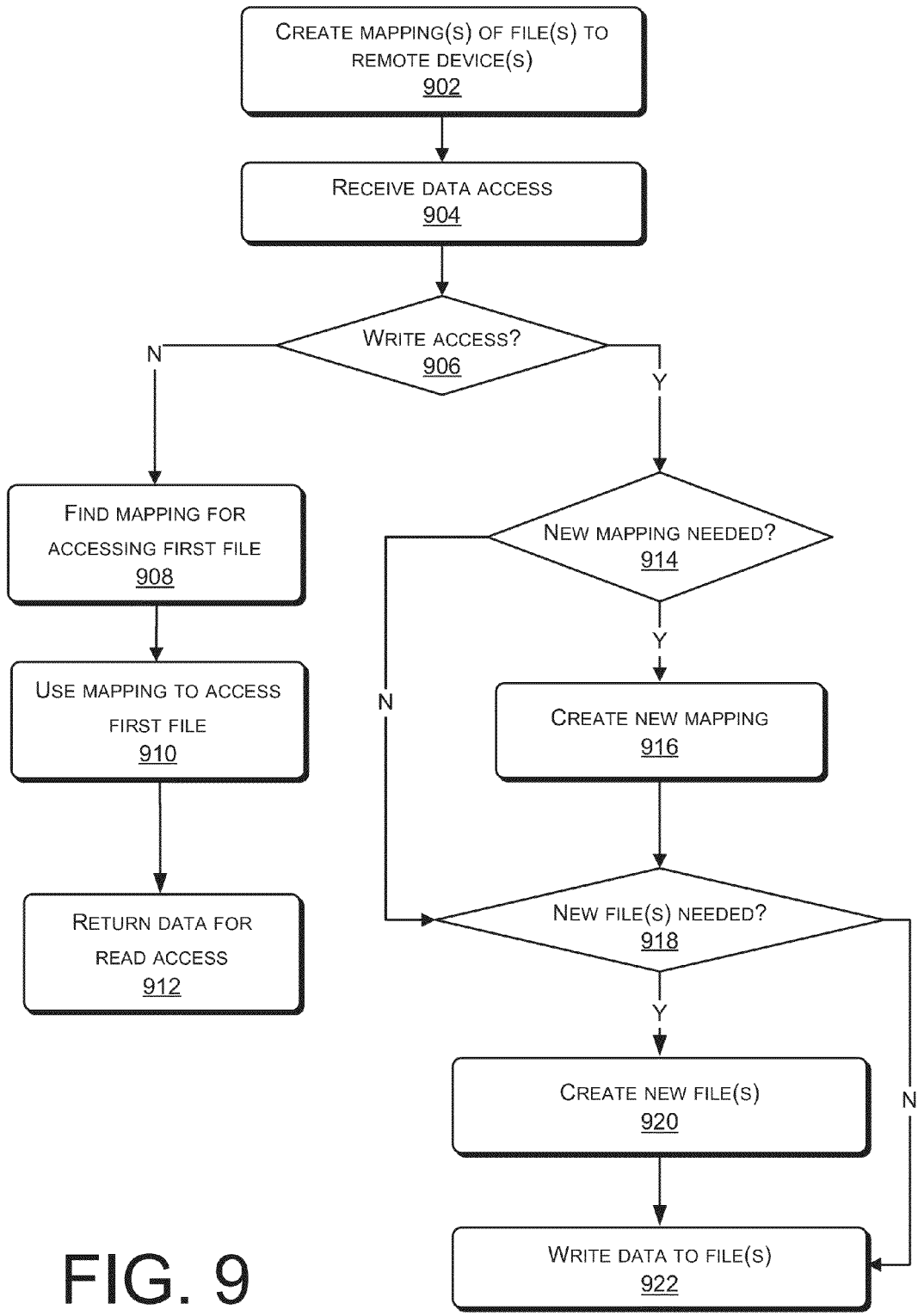
FIG. 9 is a flowchart for operation of distributed FAT, according to one or more embodiments.

FIG. 9 is an exemplary flowchart illustrating a method of using DFAT. It is noted that different steps may be used in addition to, or instead of, the ones described. Also, some steps may be performed in parallel, or in different sequence, from what is shown. When it is described that a step of a method is being performed, it is understood that it may be one or more programs executing on one or more servers that may be performing this functionality; or it may also include a mobile device and/or a personal computer, among others. Furthermore, some elements may be performed in a distributed fashion, such as by using host(s), communication device(s), and/or smart device(s). For example, method 900 of FIG. 9 can be implemented by various elements of FIG. 1.

In step 902, mappings are created between files that can be indicated by a host device and files on local device(s). For example, CTL 610 can create a mapping (e.g., using FAT 612). In one embodiment, each such mapping can map data/file indicated by host to data/files on remote device 605(1)-605(N) and/or cloud storage. In one embodiment, each such mapping can map data/file indicated by host to socket(s) of socket layer 614. In this implementation, socket(s) can be associated with data/files on remote device 605(1)-605(N) and/or cloud storage. Element 902 can be executed prior to receiving data access commands from the host.

In step 902, an access, such as a read access, is received for a first file. For example, OS may request such access to a certain file, such as a media file (e.g., an MTP access) using a USB command. This OS request can be received by the CTL, such as directly from the OS, via a host interface (in implementation of FIG. 2), or via the communication protocol layer (in implementation of FIG. 4). Alternatively, an access may be made by the OS for the certain data, and the OS may be able to identify that this data is located in certain cluster; this may be an example of MSC access, as explained below.

In element 906, the CTL can determine whether the access is a read or a write access. If it is a read, then CTL can execute element 908 next. If it is a write, then CTL can execute 914 next.

In element 908, the CTL can find mapping to access the data/file indicated by the read request (i.e., the read data access). For example, the CTL can access mappings in the associated FAT table, such as FAT 612. For example, CTL can access the FAT to find the mapping(s) to a socket is associated with the cluster storing the data/file being requested.

In element 910, the mapping may be used to access the data/file. The data/file can be located on the smart device(s) and/or cloud storage, as indicated by the mapping(s). In one implementation, the socket that is associated with the FAT entry is used to access the associated cluster over the network. In other implementations, there may be several data portions, and thus several sockets, that may be mapped to various data portions of the requested file.

In case of MSC access, the OS may already be able to determine what cluster to access. Therefore the OS may issue a USB command to access this cluster. In other types of access, the CTL can use multiple sockets to access multiple data/files that correspond to the read request. In one embodiment, in case of MTP access (as explained below), the mapping may be used to access a socket that corresponds to this file on a smart device. In this case, a single socket may be used to access the whole file from the smart device. For example, a USB command (such as MTP access by the host) can be translated (i.e., by using the mapping) to a network command. This network command can be used to access the first file located on the smart device.

In step 912, the data (e.g., from accessing the cluster) is returned by the CTL system to the OS (or any other application requesting this access).

In step 914, the CTL may determine that new mapping(s) are needed for a write data/file access. The CTL can create new FAT entries (e.g., in FAT table 612) in element 916 if new mappings are needed. The new mapping(s) can map to socket(s). In one implementation, a mapping data structure maps FAT entries to sockets. If no new mappings are needed, the CTL can determine (in element 918) whether new file(s) should be created. If new files should be created, the CTL can generate (in element 920) commands for new file(s) to be created. These commands for new file(s) generation can reference existing and/or new FAT entries of the FAT table. In element 922, the data can be written to the file(s).

Figure 10A:
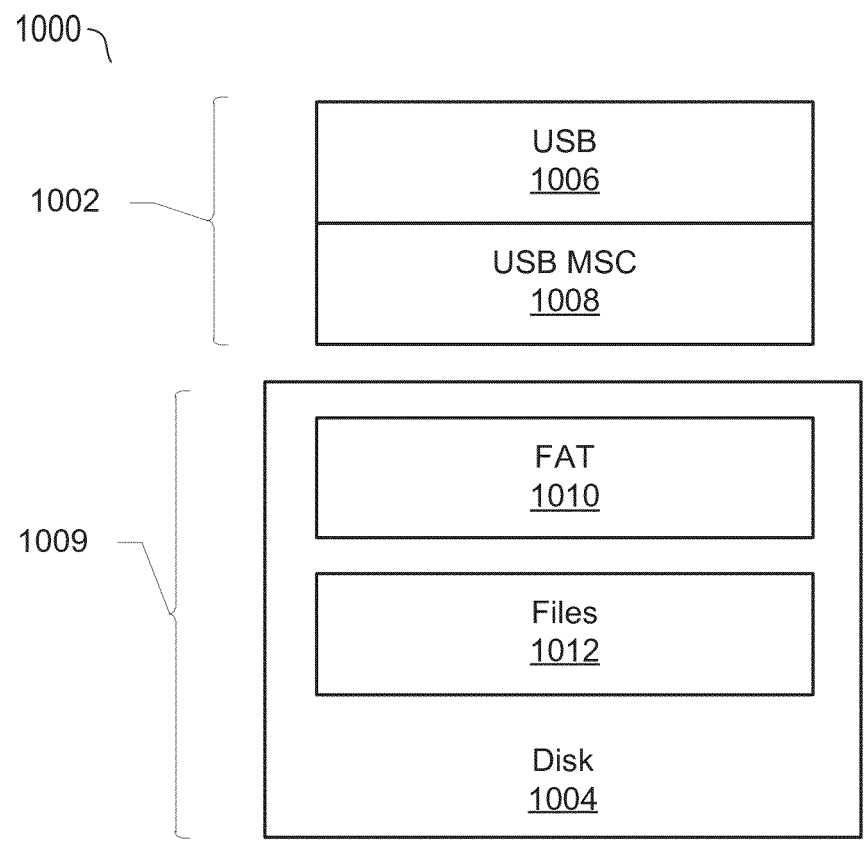
FIGS. 10A and 10B are block diagrams illustrating MSC that uses distributed FAT, according to one or more embodiments.
Figure 10B:
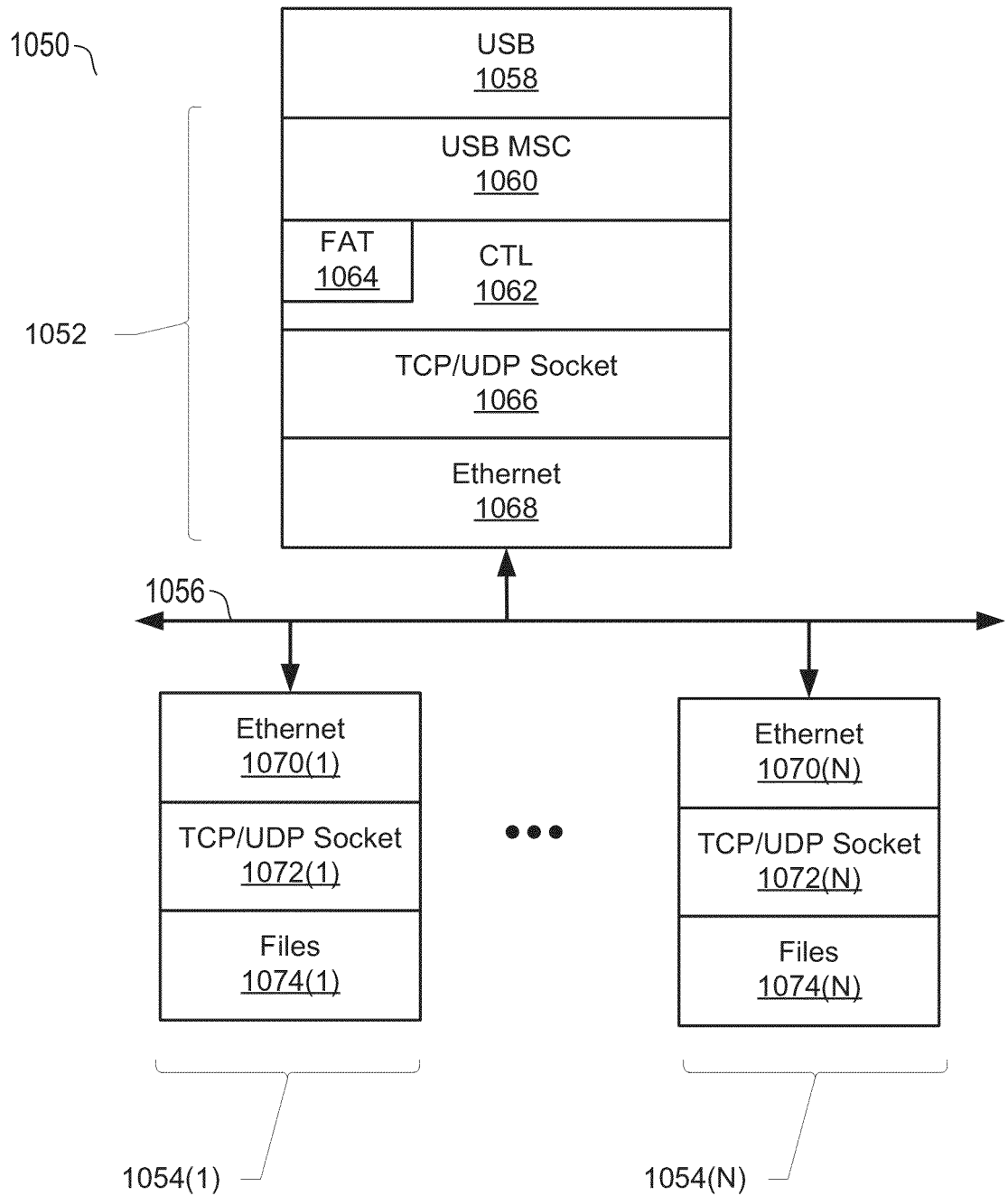

FIGS. 10A and 10B illustrate embodiments of mass storage class (MSC) commands that use DFAT. FIG. 10A is a block diagram 1000 that illustrates a typical USB portion 1002 that includes a USB interface 1006 and a USB MSC layer 1008. USB MSC commands typically are issued by USB MSC layer 1008, and then are communicated with a device 1009, that can include a disk 1004, FAT 1010, and files 1012. The USB MSC commands typically use FAT 1010 to access files 1012. In other words, device 1009 contains both FAT 1010 and files 1012 (on disk 1004).

FIG. 10B is a block diagram 1050 that illustrates embodiments of a USB MSC system that uses DFAT. Mass storage class (MSC) is a protocol that allows a Universal Serial Bus (USB) device 1052 to become accessible to a host computing device (e.g., the host), to enable file transfers between the two. To the host device, communication device 1052 appears similar to an external hard drive, enabling drag-and-drop file transfers. In contrast, as shown in FIG. 10B, the files are distributed over several smart devices (devices 1-N).

In one embodiment, FIG. 10B shows a communication device 1052, such as communication device 102(1)-102(4) of FIG. 1 and one or more smart devices 1054(1)-1054(N), such as smart devices 108(1)-108(3) of FIG. 1. In one embodiment, communication device 1052 includes an USB layer 1058, USC MSC layer 1060, a FAT module 1064, Content Transport Layer (CTL) 1062, TCP/UDP Socket layer 1066, and a network module 1068. Communication device 1052 can connect to smart devices 1054(1)-1054(N) via network 1056. It is understood that with reference to FIG. 6, and other Figs, the term layer and/or module can refer to software, hardware, firmware, and/or any combination of these. In one embodiment, each smart device 1054(1)-1054(N) includes network module 1070(1)-1070(N), socket 1072(1)-1072(N), and files 1074(1)-1074(N). In one embodiment, smart device 1054(1)-1054(N) can be virtualized by cloud storage. In one embodiment, smart device 1054(1)-1054(N) can implement network module 1070(1)-1070(N) and socket 1072(1)-1072(N), but one or more of files 1074(1)-1074(N) are stored using (and thus accessed by reading/writing from) cloud storage.

In one embodiment, the USB, USB MSC, FAT/CTL, socket, and network layers are contained in a single host (e.g., the built-in DFAT implementation). It is noted that the TCP/UDP socket and Ethernet layers are shown for exemplary purposes only, the sockets can themselves be able to access various other network protocols. In one variation, the host may be able to use different types of sockets, one for each type of a network. The network layer would correspond to the socket type, e.g., Bluetooth, Firewire, WiFi, etc.

In another embodiment, the USB and USB MSC layers are contained on a host, whereas the FAT/CTL, socket, and network layers are included on a communication device (e.g., communication device 104(1)-104(4) of FIG. 2). In this case, the host and the communication device could also contain additional layers for communication between each other.

In other words, DFAT distributes MSC storage over a network. However, DFAT makes this distribution aspect transparent to requesting applications (i.e., on the host). DFAT allows data to be stored in locations other than directly attached storage devices. DFAT eliminates any typical requirements of cluster mapping being tightly coupled to a disk. Instead, the clusters may be mapped to files that are data structures which are located on the network and accessible through sockets.

Figure 11A:
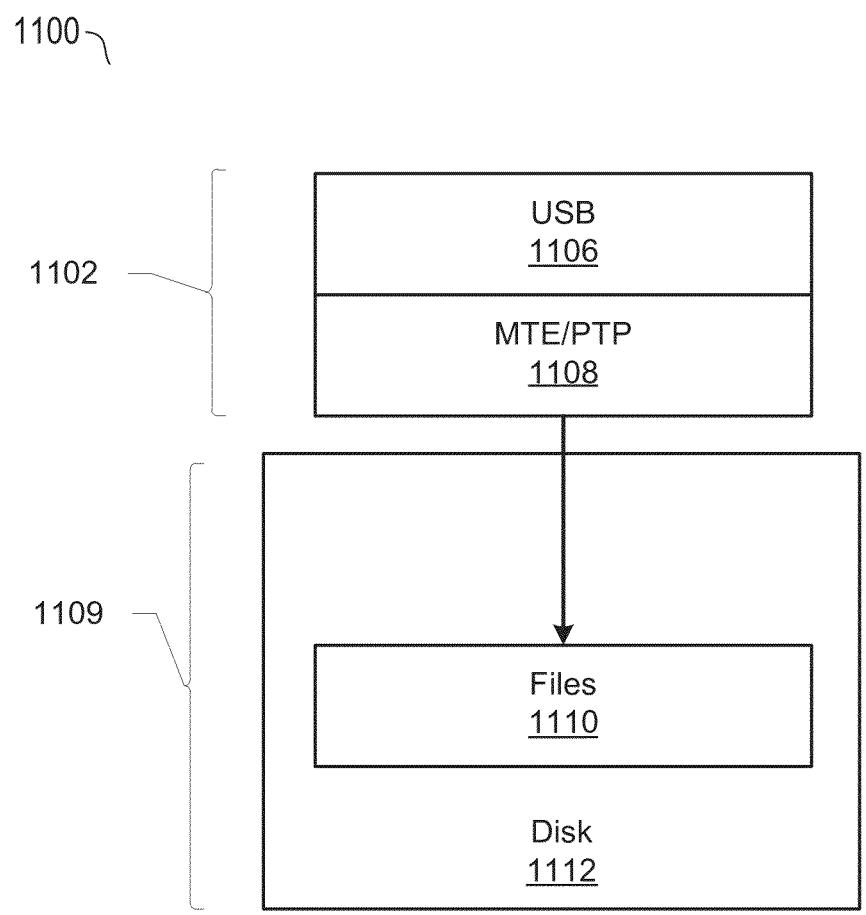
FIGS. 11A and 11B are block diagrams illustrating MTP/PTP that use Distributed FAT, according to one or more embodiments.
Figure 11B:
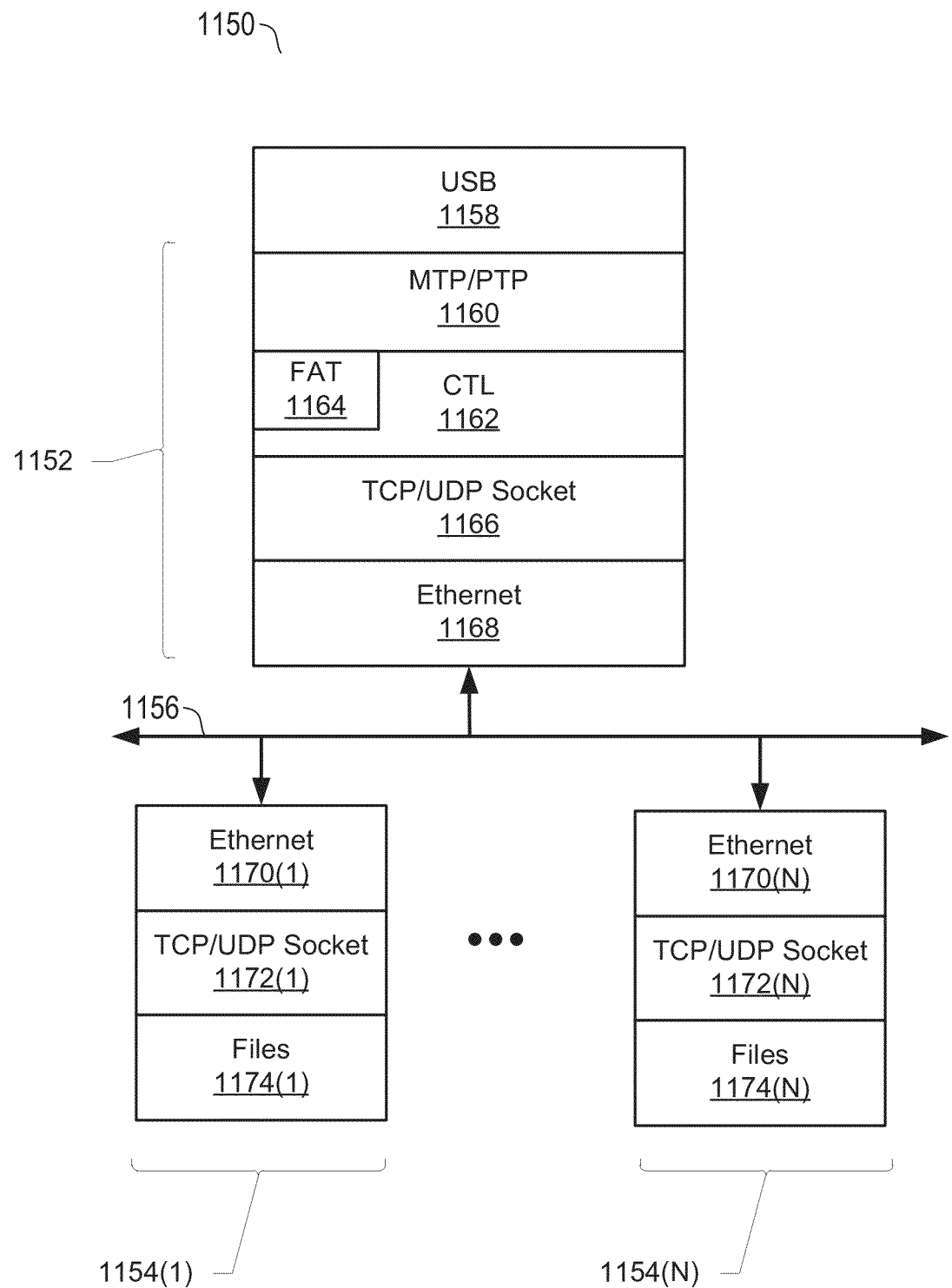

FIGS. 11A and 11B illustrate typical DFAT implementations of MTP (Media Transfer Protocol). FIG. 11A illustrates a typical MTP architecture. MTP is an extension of PTP (Picture Transfer Protocol), and both allow access, usually over USB, to files over a network. MTP, in contrast with MSC, typically only allows access to one file at a time, as opposed to blocks/clusters of data (as with MSC).

FIG. 11A is a block diagram 1100 that illustrates a typical USB portion 1102 that includes a USB interface 1106 and a USB MSC layer 1108. USB MTP/PTP commands typically are issued by USB MTP/PTP layer 1108, and then are communicated with a device 1109, that can include a disk 1104 and files 1110. The USB MTP/PTP commands typically access files 1110 directly.

In one embodiment, FIG. 11B shows a communication device 1152, such as communication device 102(1)-102(4) of FIG. 1 and one or more smart devices 1154(1)-1154(N), such as smart devices 108(1)-108(3) of FIG. 1. In one embodiment, communication device 1152 includes an USB layer 1158, USC MTP/PTP layer 1160, a FAT module 1164, Content Transport Layer (CTL) 1062, TCP/UDP Socket layer 1116, and a network module 1118. Communication device 1150 can connect to smart devices 1154 via network 1156. It is understood that with reference to FIG. 11B, and other Figs, the term layer and/or module can refer to software, hardware, firmware, and/or any combination of these. In one embodiment, each smart device 1154(1)-1154(N) includes network module 1170(1)-1170(N), socket 1172(1)-1172(N), and files 1174(1)-1174(N). In one embodiment, smart device 1154(1)-1154(N) can be virtualized by cloud storage. In one embodiment, smart device 1154(1)-1154(N) can implement network module 1170(1)-1170(N) and socket 1172(1)-1172(N), but one or more of files 1174(1)-1174(N) are stored using (and thus accessed by reading/writing from) cloud storage.

Distributed FAT allows MTP access over a network. It is different than all other implementations of mass storage devices like thumb drives and external hard drives, as it allows data to be stored in places other than the directly attached storage device. Content mapping in MTP is based on a physical disk. Distributed FAT eliminates the notion that MTP files and directories have to be present on the disk. Instead files are mapped so that they located on the network and are read through sockets. As seen in FIG. 11B, the architecture of DFAT's implementation of MTP is similar to that of DFAT's MSC.

Figure 12:
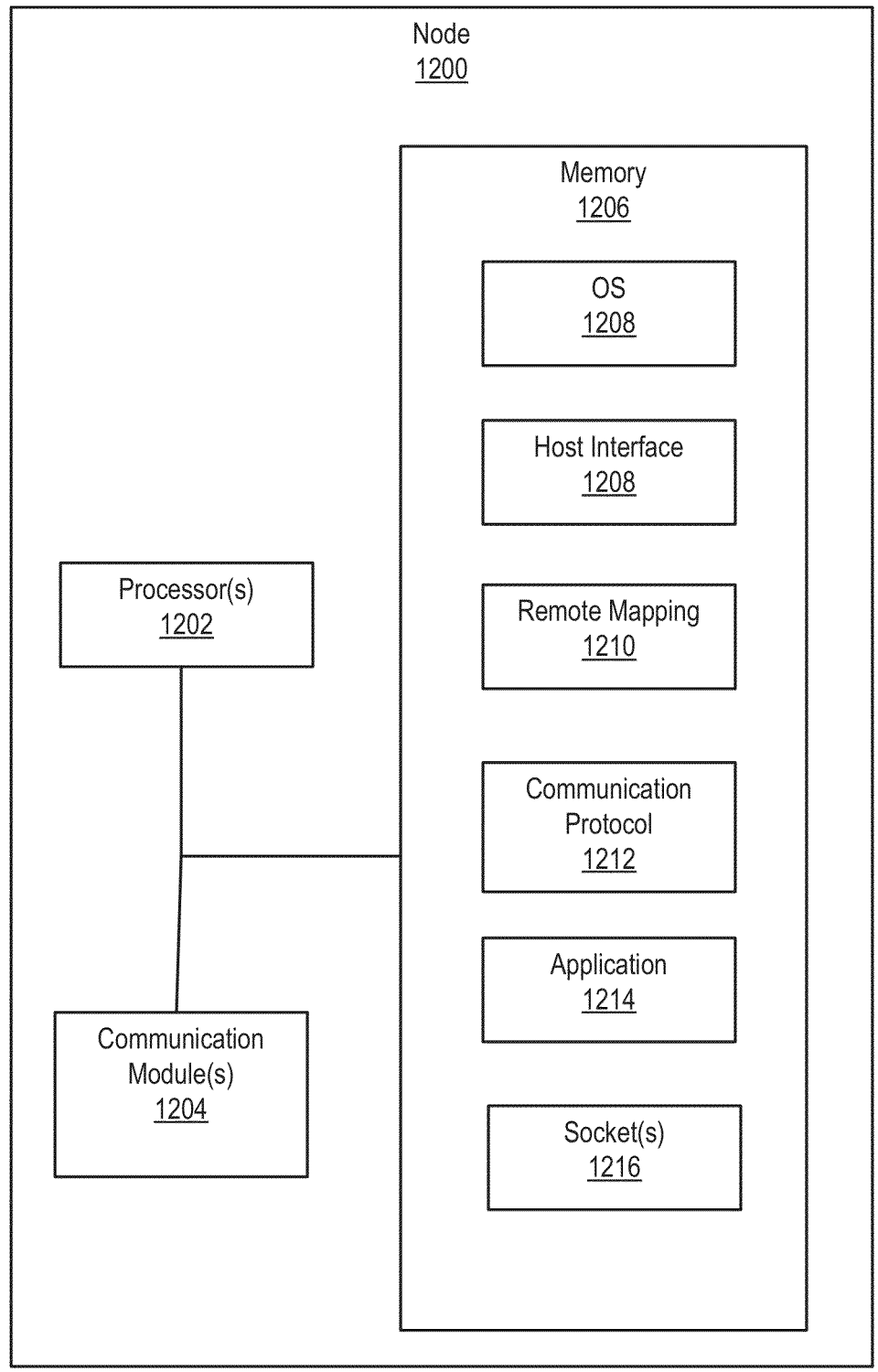
FIG. 12 is a block diagram of a node that can implement various devices, according to one or more embodiments.

FIG. 12 is a block diagram of a node that can implement various devices, according to one or more embodiments. Node 1200 can implement one or more of host, communication device(s), and smart devices, among others. Node 1200 includes one or more processors 1202, communication module(s) 1204, and memory 1206. Communication module(s) 1204 can be configured to facilitate communication using any number of networks discussed herein, such as Ethernet, WiFi, USB, Bluetooth, Firewire, among others. Memory 1206 can include any number of executable software described herein, such as OS 1208, a host interface 1210, a remote mapping layer 1214, a communication protocol 1216, an application 1218, and/or socket(s) 1220, among others. Memory 1206 can also store one or more mappings 1212, such as mappings used by the DFAT module(s). One or more of software 1208-1216 can be executed using the one or more processors. In some embodiments, when implemented in communication device(s), communication module(s) 1204 can be used with host interface 1208 to communicate with a host device, such as over a USB network. Communication module(s) 1204 can be used with socket(s) 1220 to communicate with smart device(s) and/or cloud storage, such as over a wired and/or wireless network.

Example Computer Implementation

Figure 13:
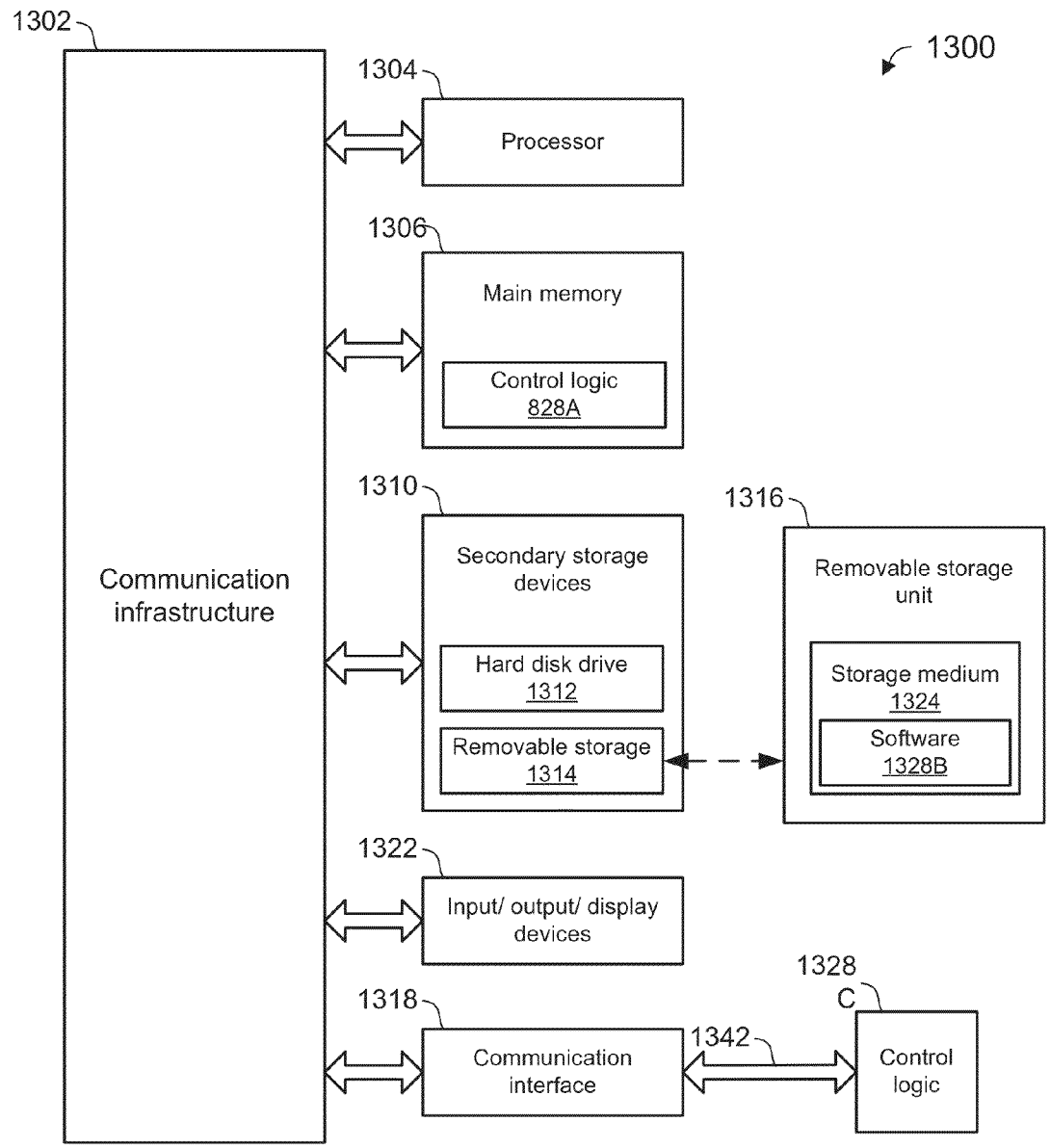
FIG. 13 is a block diagram illustrating systems that may implement the distributed storage system techniques.

The embodiments described herein, including systems, methods/processes, and/or apparatuses, may be implemented using well known servers/computers, such as computer 1300 shown in FIG. 13. For instance, elements of example distributed storage system 100, including any of communication devices 104, and smart devices 108, depicted in FIGS. 1-2, 4, 6-8, and 10-11, and elements thereof, each of the steps of flowcharts 300, 350, 500, 550, and 900, can each be implemented using one or more computers 1300.

Computer 1300 can be any commercially available and well known computer capable of performing the functions described herein, such as computers available from International Business Machines, Apple, Sun, HP, Dell, Cray, etc. Computer 1300 may be any type of computer, including a desktop computer, a server, tablet PC, or mobile communication device, etc.

As shown in FIG. 13, computer 1300 includes one or more processors (e.g., central processing units (CPUs)), such as processor 1306. Processor 1306 may include any modules and/or layers of FIGS. 1-2, 4, 6-8, and 10-11, and/or any portion or combination thereof, for example, though the scope of the embodiments is not limited in this respect. Processor 1306 is connected to a communication infrastructure 1302, such as a communication bus. In some embodiments, processor 1306 can simultaneously operate multiple computing threads.

Computer 1300 also includes a primary or main memory 1308, such as a random access memory (RAM). Main memory has stored therein control logic 1324A (computer software), and data.

Computer 1300 also includes one or more secondary storage devices 1310. Secondary storage devices 1310 include, for example, a hard disk drive 1312 and/or a removable storage device or drive 1314, as well as other types of storage devices, such as memory cards and memory sticks. For instance, computer 1300 may include an industry standard interface, such as a universal serial bus (USB) interface for interfacing with devices such as a memory stick. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1318 having stored therein computer software 1324B (control logic) and/or data. Removable storage unit 1316 represents a floppy disk, magnetic tape, compact disc (CD), digital versatile disc (DVD), Blue-ray disc, optical storage disk, memory stick, memory card, or any other computer data storage device. Removable storage drive 1314 reads from and/or writes to removable storage unit 1316 in a well known manner.

Computer 1300 also includes input/output/display devices 1304, such as monitors, keyboards, pointing devices, etc. Computer 1300 further includes a communication or network interface 1320. Communication interface 1320 enables computer 1300 to communicate with mobile devices. For example, communication interface 1320 allows computer 1300 to communicate over communication networks or mediums 1322 (representing a form of a computer useable or readable medium), such as local area networks (LANs), wide area networks (WANs), the Internet, etc. Network interface 1320 may interface with remote sites or networks by using wired or wireless connections. Examples of communication interface 1322 include but are not limited to a modem, a network interface card (e.g., an Ethernet card), a communication port, a Personal Computer Memory Card International Association (PCMCIA) card, etc.

Control logic 1324C may be transmitted to and from computer 1300 by using the communication medium 1322. Any apparatus or manufacture comprising a computer useable or readable medium having control logic (software) stored therein is referred to herein as a computer program product or program storage device. This includes, but is not limited to, computer 1300, main memory 1308, secondary storage devices 1310, and removable storage unit 1316. Such computer program products, having control logic stored therein that, when executed by one or more data processing devices, because such data processing devices to operate as described herein, represent embodiments of the invention.

For example, each of the elements of the host device 102, communication device 104, and/or smart device 108 depicted in FIGS. 1-7 can be implemented as control logic that may be stored on a computer useable medium or computer readable medium, which can be executed by one or more processors to operate as described herein.

Although the present application has been described in connection with several embodiments, the application is not intended to be limited to the specific forms set forth herein. On the contrary, it is intended to cover such alternatives, modifications, and equivalents as can be reasonably included within the scope of the invention as defined by the appended claims.

The invention claimed is:

1. A method comprising:
receiving, at a third device, a host read request for a first file, wherein
the host read request is generated by a first device, and
the host read request is configured to access a file on the first device;
accessing a plurality of mappings stored on the third device, wherein
the accessing identifies a first mapping of the plurality of mappings, and
the first mapping identifies the first file on a second device;
accessing the first file, wherein
the accessing the first file is performed using the first mapping, and
the accessing the first file comprises
communicating with the second device to read the first file, wherein
the communicating with the second device comprises
generating a second read request based on the host read request;
sending the second read request to the second device; and
receiving a response from the second device, wherein
the response comprises data indicated by the host read request; and
returning the first file to the first device, wherein
the returning is performed in response to the receiving of the host read request.

2. The method of claim 1, further comprising:
creating a mapping of files to remote files, wherein
the files are associated with the first device,
the remote files are located on the second device, and
the first device and the second device are coupled together using at least one network.

3. The method of claim 1, wherein
the host read request is received from the first device using a first network protocol,
the communicating with the second device is performed using a second network protocol, and
the first network protocol is different from the second network protocol.

4. The method of claim 1, wherein
the second device is virtualized using one or more servers.

5. The method of claim 2, wherein the creating the mapping comprises:
mapping a cluster of the second device to a socket of the first device, wherein
the socket is associated with a File Access Table (FAT) entry of the first device.

6. The method of claim 5, wherein the using the mapping comprises:
accessing, using the socket, the cluster of the second device, wherein
data associated with the cluster is stored using cloud storage.

7. The method of claim 1, wherein
the accessing further identifies a second mapping of the plurality of mappings, and the second mapping identifies a second file;
and further comprising:
accessing the second file, wherein
the accessing the second file is performed using the second mapping.

8. A system comprising:
one or more processors,
a host interface module configured to:
receive a host read request for a first file, wherein
the host read request is received from a first device, and
the host read request is configured to access a file on the first device;
a mapping module configured to:
access a plurality of mappings stored on the mapping module, wherein
the mapping module identifies a first mapping of the plurality of mappings, and
the first mapping identifies a first file on a second device; and
a communication module configured to:
access the first file, wherein
the accessing the first file is performed using the first mapping,
the accessing the first file using the first mapping comprises
generating a second read request based on the host read request;
sending the second read request to the second device; and
receiving a response from the second device, wherein
the response comprises data indicated by the host read request, and
wherein
the host interface module is further configured to return the first file to the first device, and
the host interface module is configured to return the first file in response to receipt of the host read request.

9. The system of claim 8, wherein the mapping module is further configured to create a mapping of files to remote files, wherein
the files are associated with the first device,
the remote files are located on the second device, and
the first device and the second device are coupled together using at least one network.

10. The system of claim 8, wherein
the communication module is coupled to the first device using a first network,
the read request is received from the first device over the first network,
the communication module is coupled to the second device using a second network,
the communication module communicates with the second device over the second network, and
the first network is different from the second network.

11. The system of claim 10, wherein
the second device is virtualized using one or more servers.

12. The system of claim 8, wherein
the mapping module is further configured to map a cluster of the second device to a socket of the communication module,
the plurality of mappings correspond to File Access Table (FAT) entries, and
the socket is associated with at least one FAT entry.

13. The system of claim 12, wherein
the communication module is further configured to access, using the socket, the cluster, wherein
data associated with the cluster is stored using cloud storage.

14. A computer program product comprising:
a plurality of instructions, comprising
a first set of instructions, executable on a computer system, configured to receive, at a third device, a host read request for a first file, wherein
the host read request is generated by a first device, and
the host read request is configured to access a file on the first device,
a second set of instructions, executable on the computer system, configured to access a plurality of mappings stored on the third device, wherein
the accessing identifies a first mapping of the plurality of mappings, and
the first mapping identifies a first file on a second device,
a third set of instructions, executable on the computer system, configured to, access the first file, wherein
the accessing the first file is performed using the first mapping, and
the accessing the first file comprises
communicating with the second device to read the first file, wherein
the communicating with the second device comprises
generating a second read request based on the host read request;
sending the second read request to the second device; and
receiving a response from the second device, wherein
the response comprises data indicated by the host read request, and
a fourth set of instructions, executable on the computer system, configured to return the first file to the first device, wherein
the returning is performed in response to the receiving of the host read request; and
a non-transitory computer-readable storage medium, wherein the instructions are encoded in the non-transitory computer-readable storage medium.

15. The computer program product of claim 14, wherein the instructions further comprise a fifth set of instructions, executable on the computer system, configured to
create a mapping of files to remote files, wherein
the files are associated with the first device,
the remote files are located on the second device, and
the first device and the second device are coupled together using at least one network.

16. The computer program product of claim 14, wherein
the host read request is received from the first device using a first network protocol,
the communicating with the second device is performed using a second network protocol, and
the first network protocol is different from the second network protocol.

17. The computer program product of claim 14, wherein
the creating the mapping is performed by the third device,
the third device is coupled to the first device, and
the third device is configured to receive host read requests and return data in response to receiving each of the host read requests.

18. The computer program product of claim 14, wherein the using the mapping comprises:
mapping a cluster of the second device to a socket of the third device, and
accessing, using the socket, the cluster of the second device, wherein
data associated with the cluster is stored using cloud storage.

* * * * *